May 7, 1968    J. M. OHNIKIAN ET AL    3,381,656
VERTICAL SCALE INDICATOR

Filed June 30, 1965    12 Sheets-Sheet 1

INVENTORS
HERBERT B. STOLOVE
JOSEPH M. OHNIKIAN
BY
OSTROLENK, FABER, GERB & SOFFEN
ATTORNEYS

May 7, 1968   J. M. OHNIKIAN ET AL   3,381,656
VERTICAL SCALE INDICATOR
Filed June 30, 1965   12 Sheets-Sheet 2
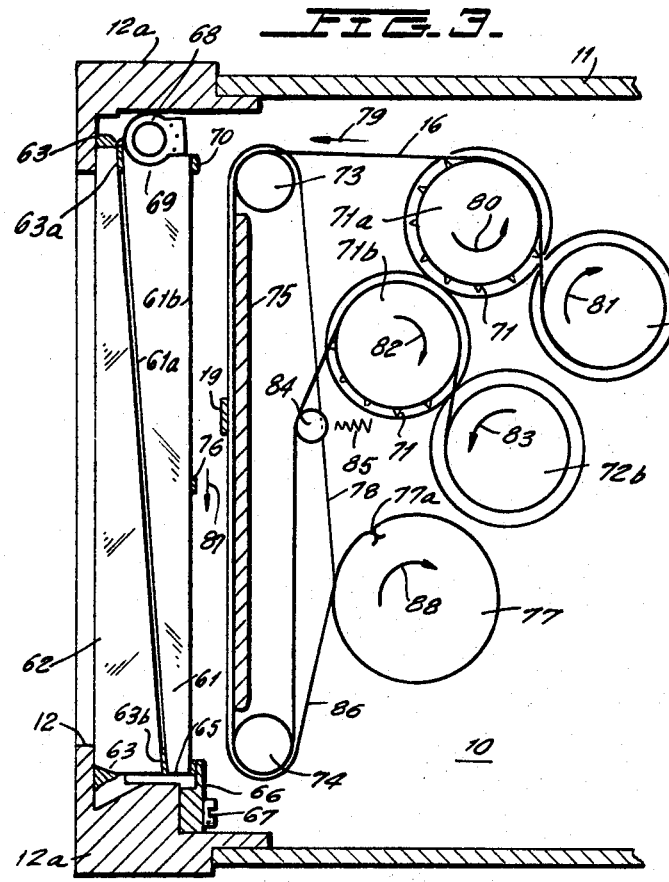
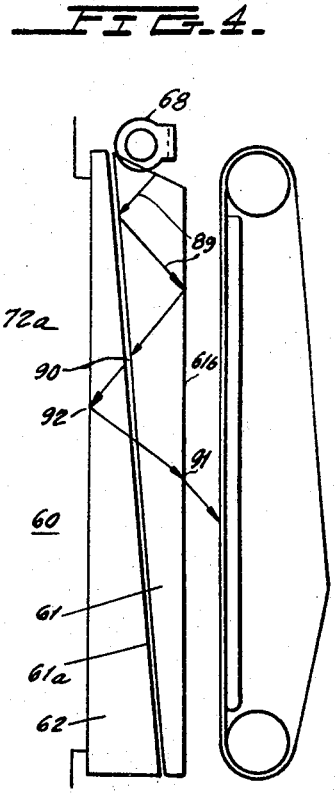
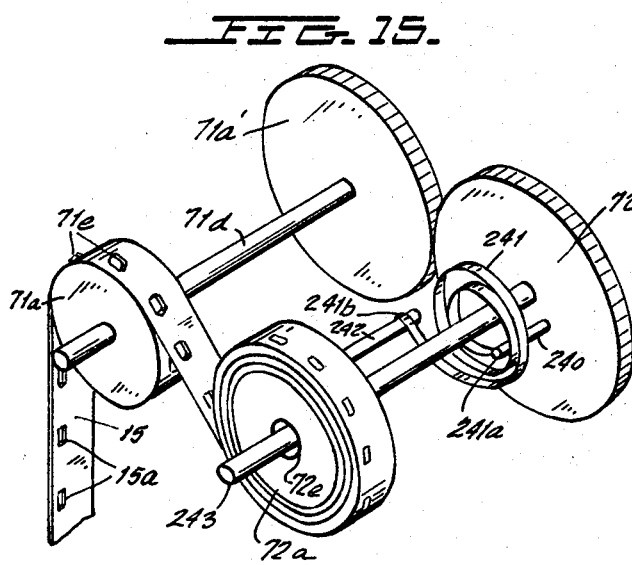
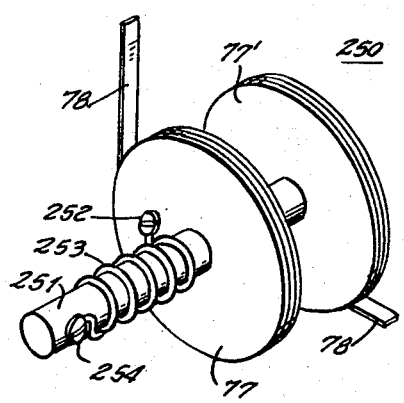
INVENTORS
HERBERT B. STOLOVE
JOSEPH M. OHNIKIAN
BY
OSTROLENK, FABER, GERB & SOFFEN
ATTORNEYS

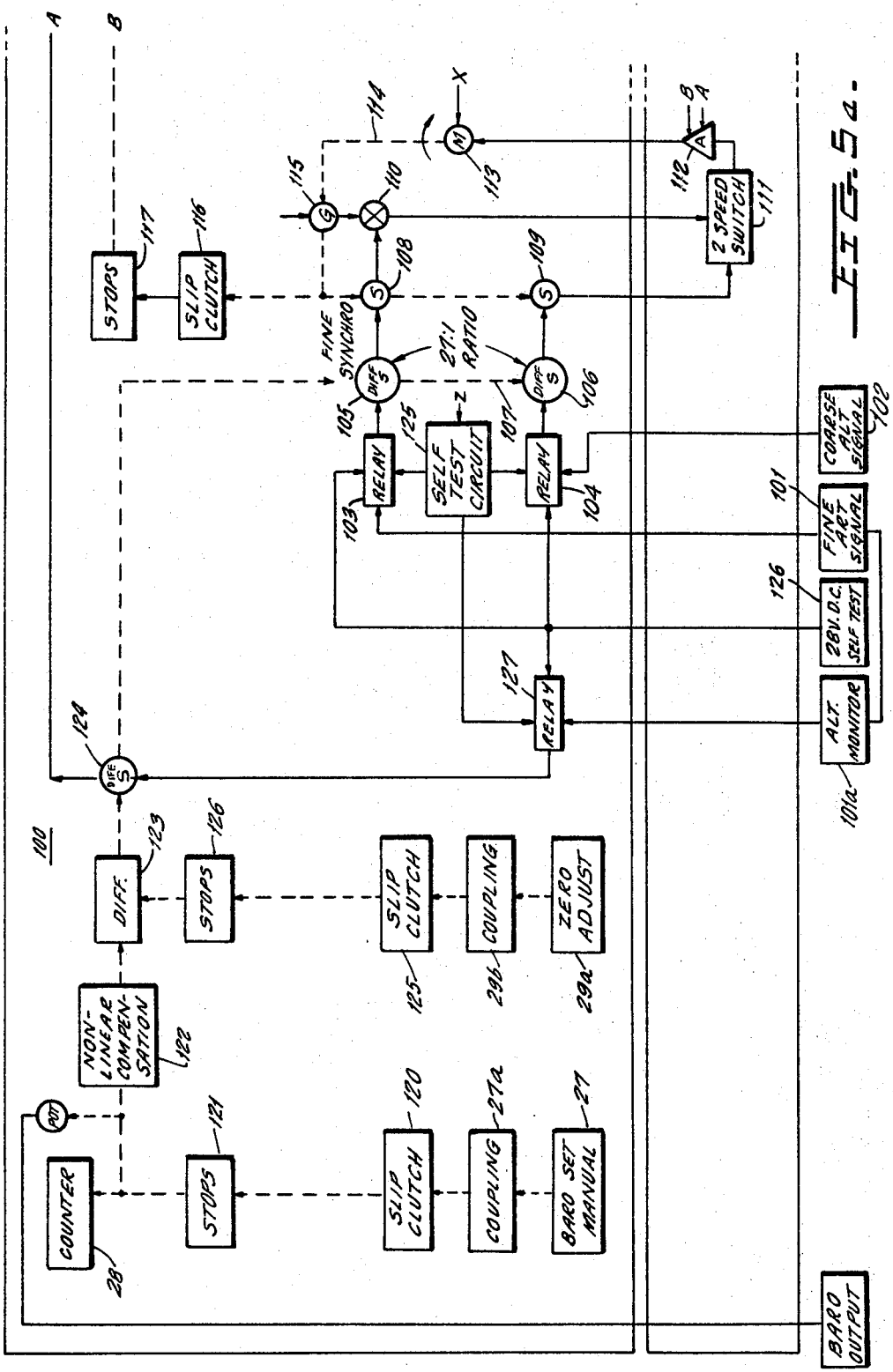

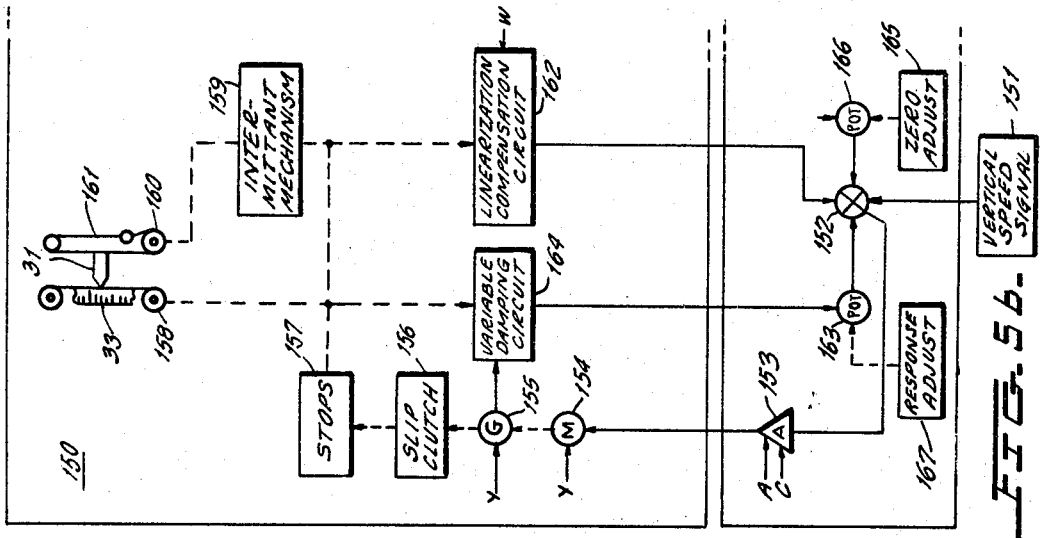
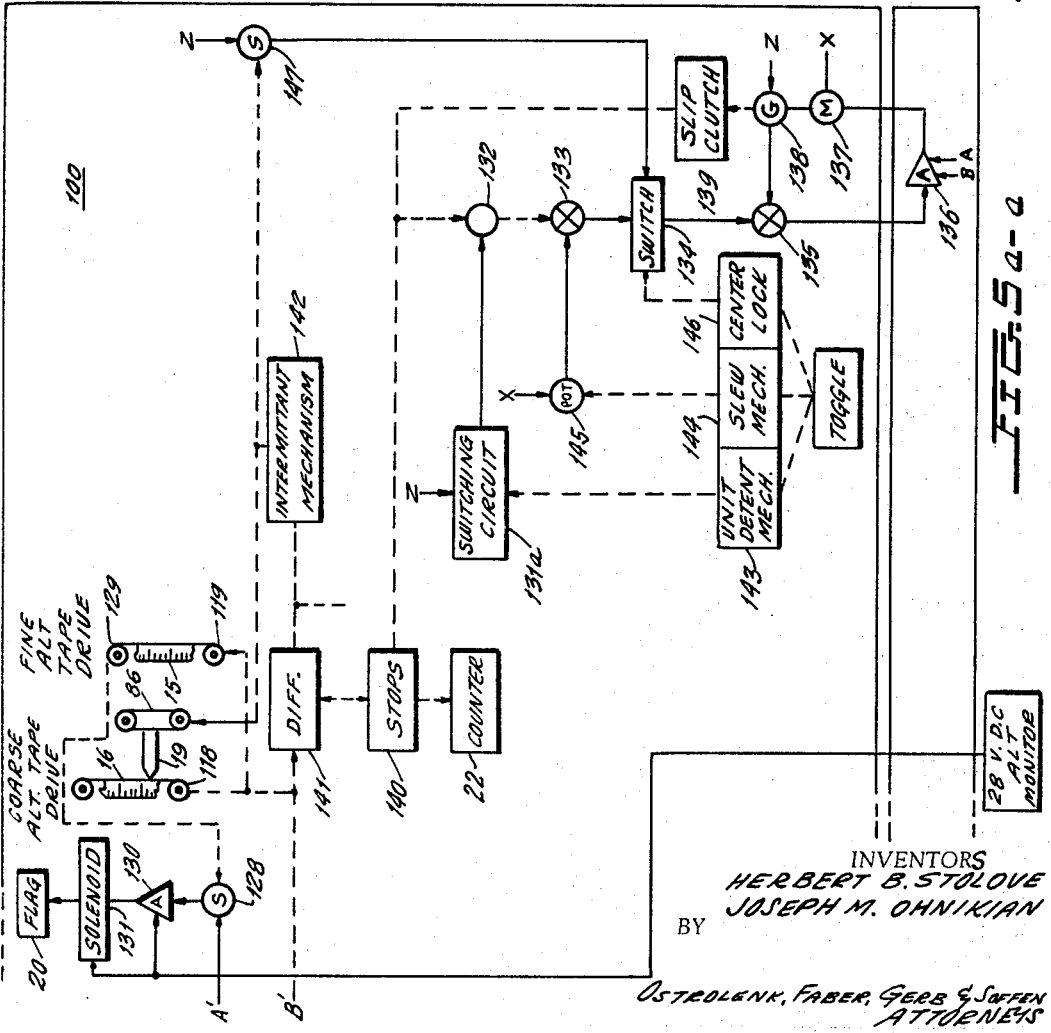

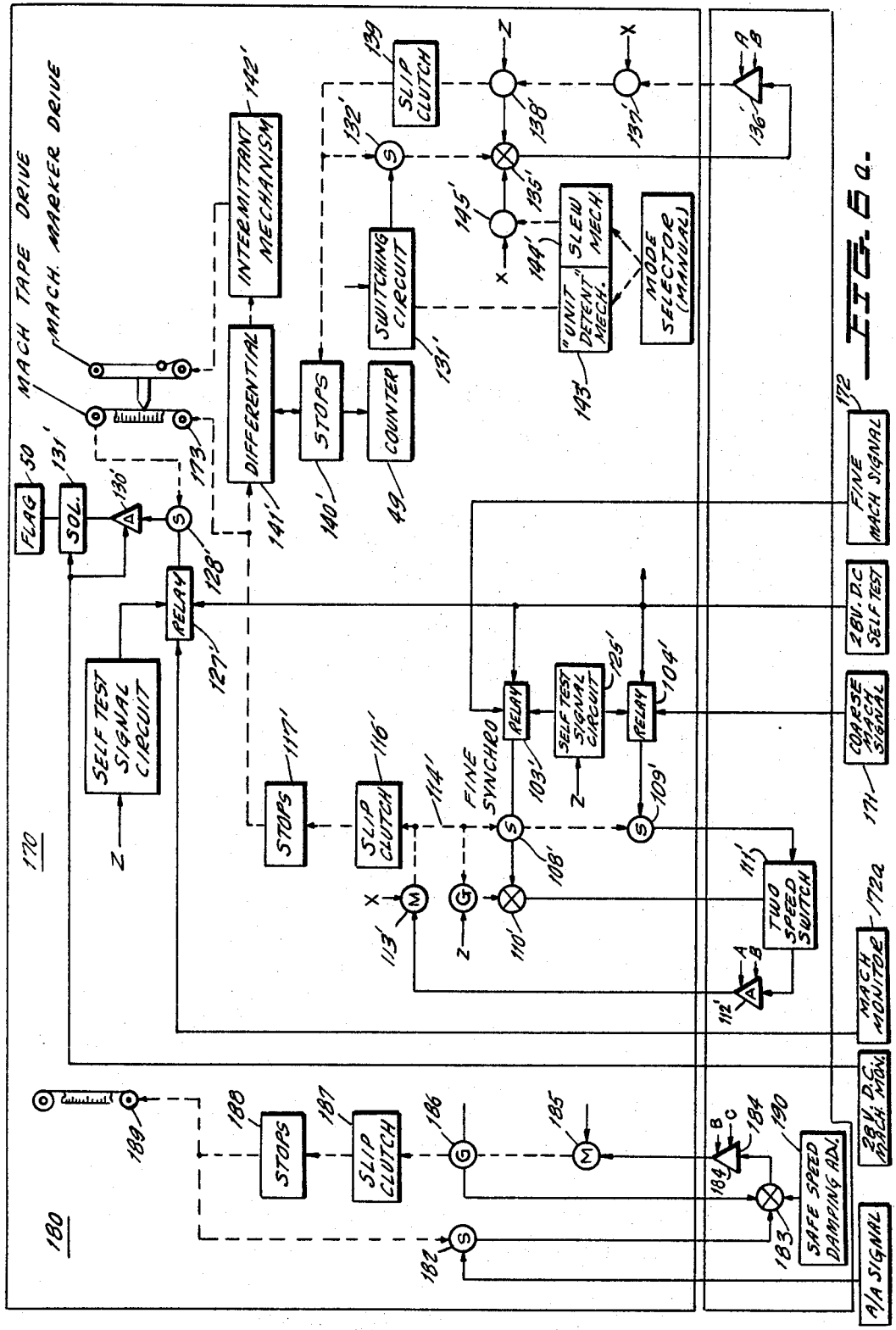

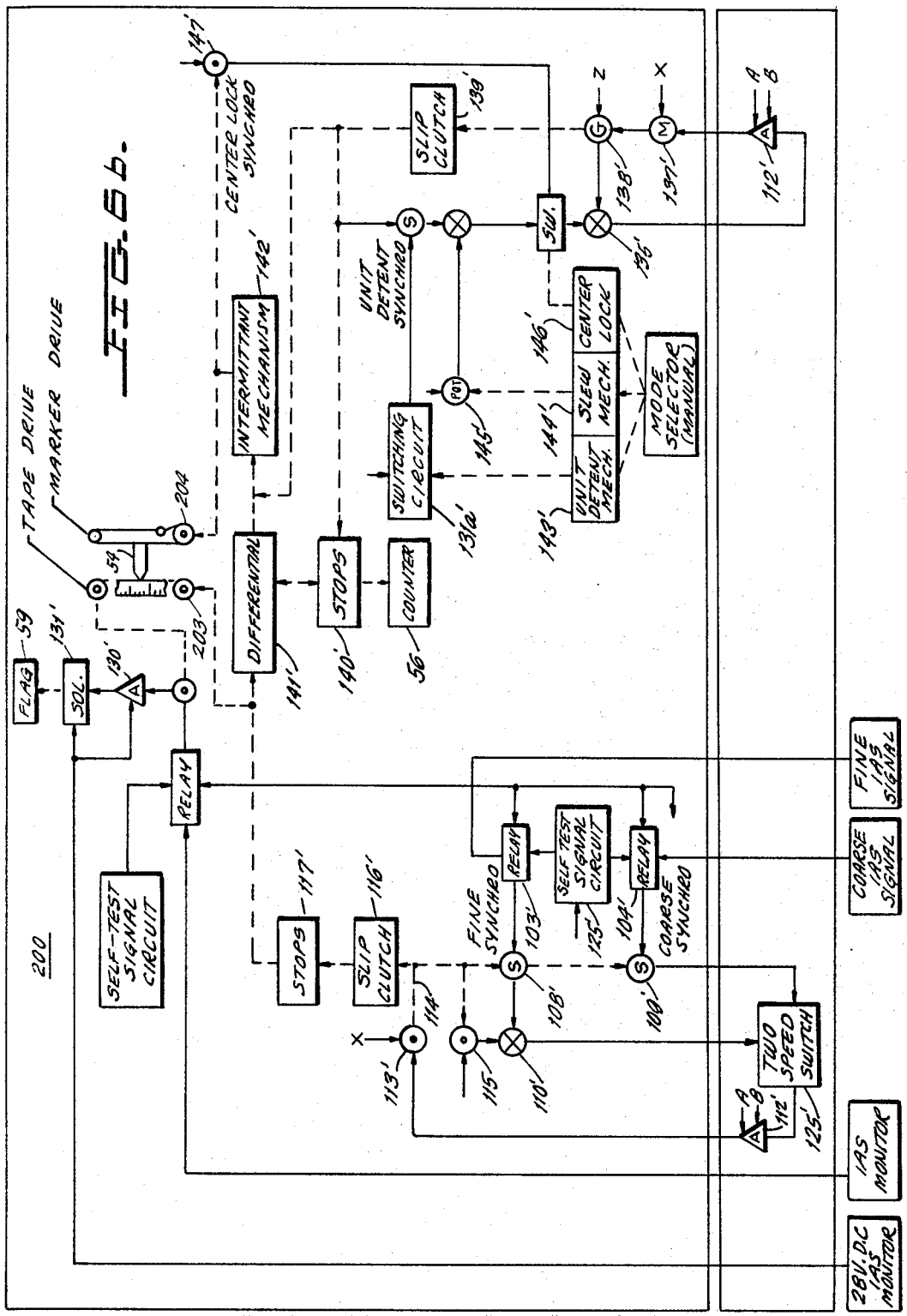

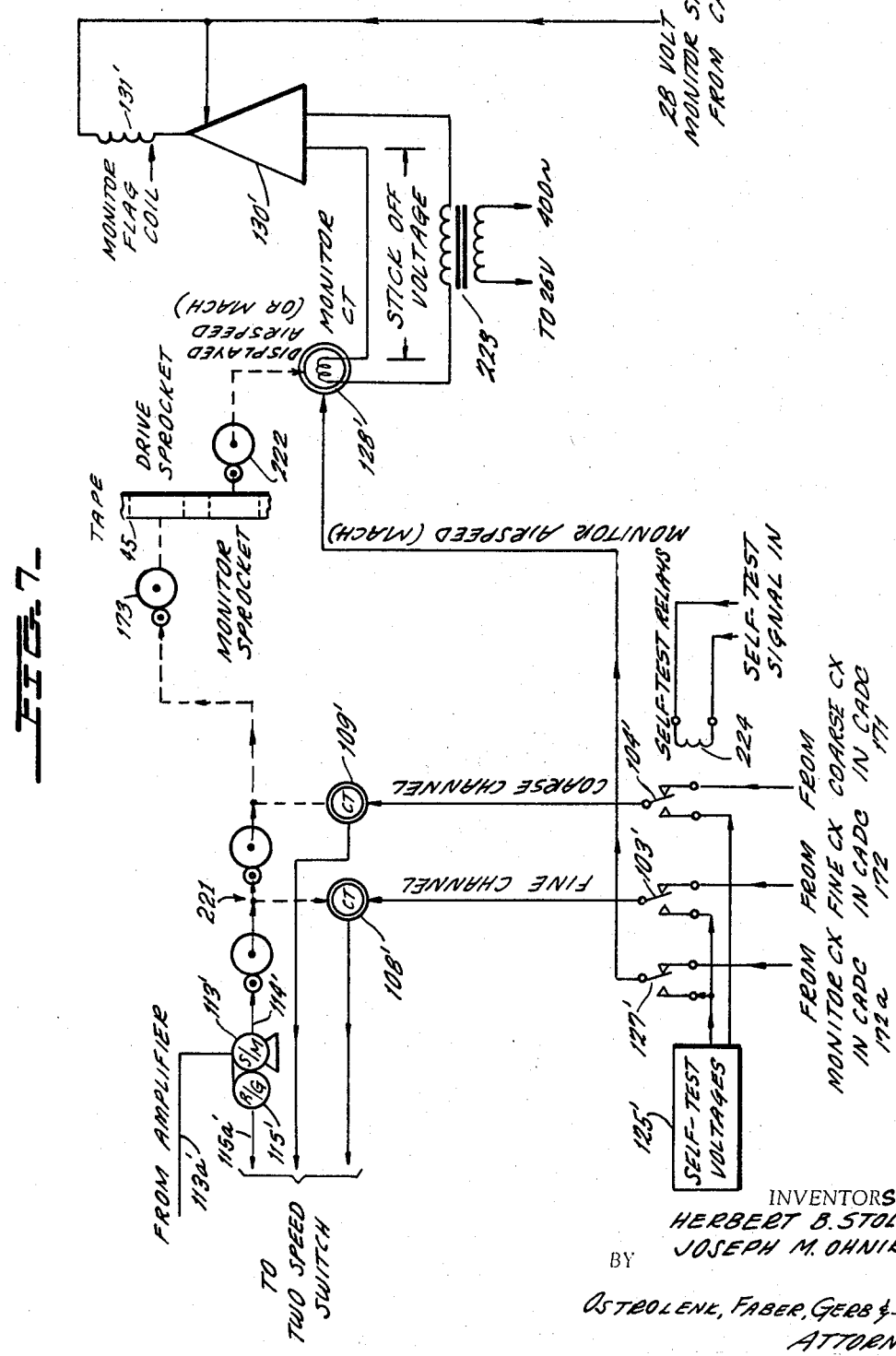

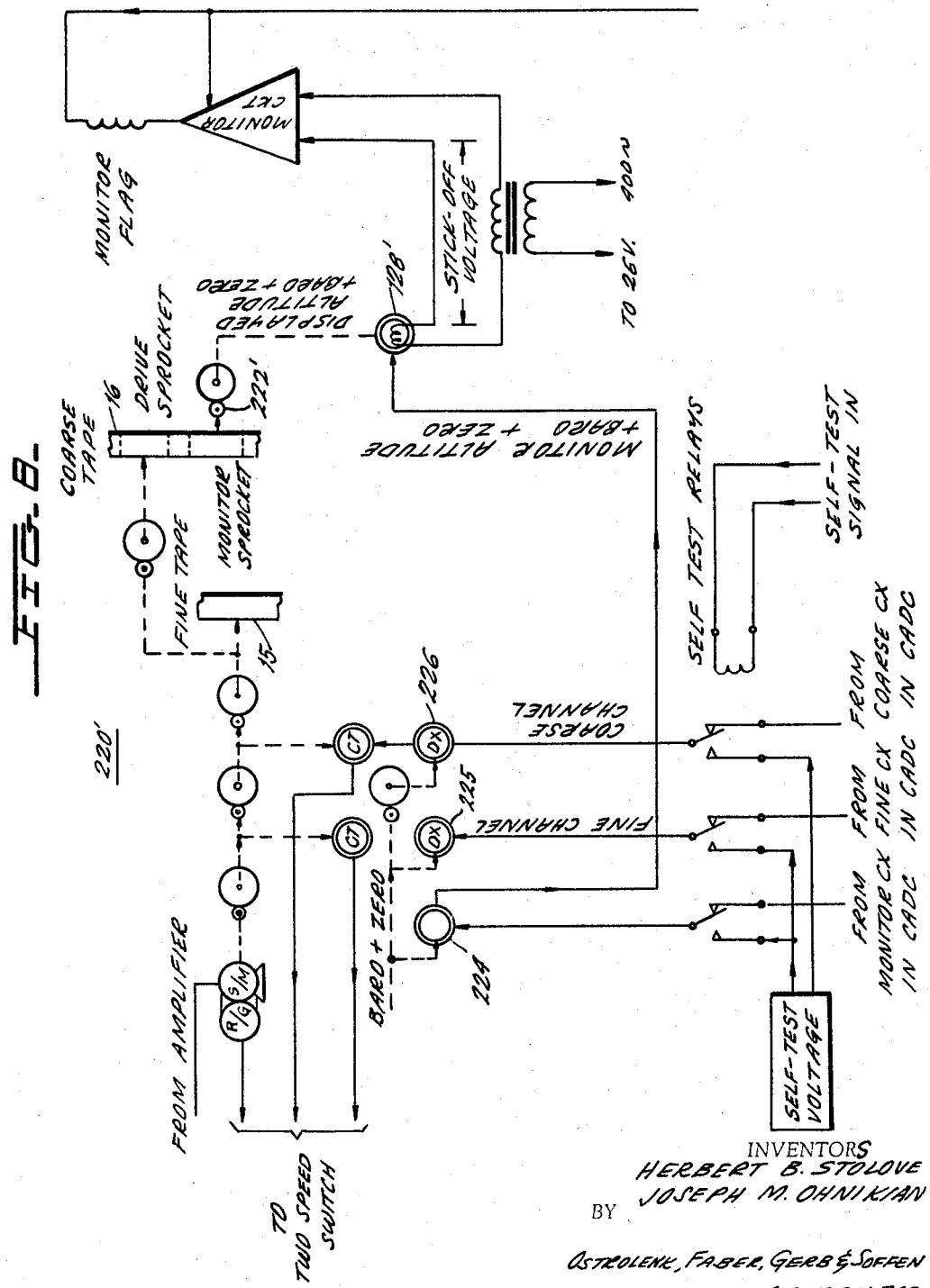

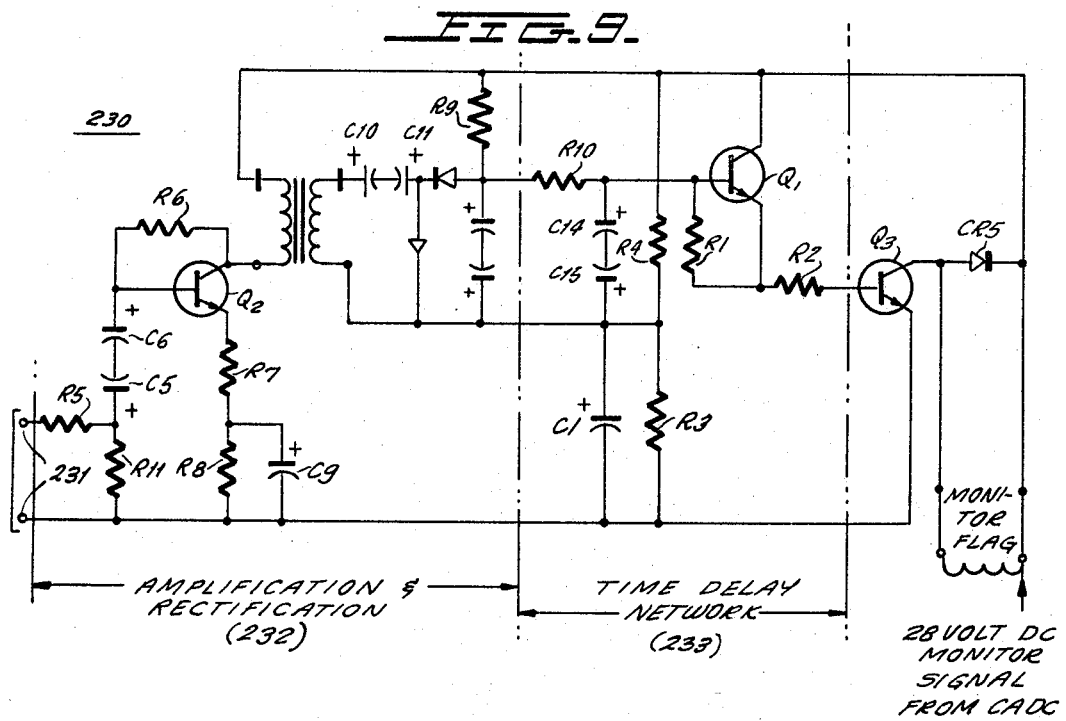
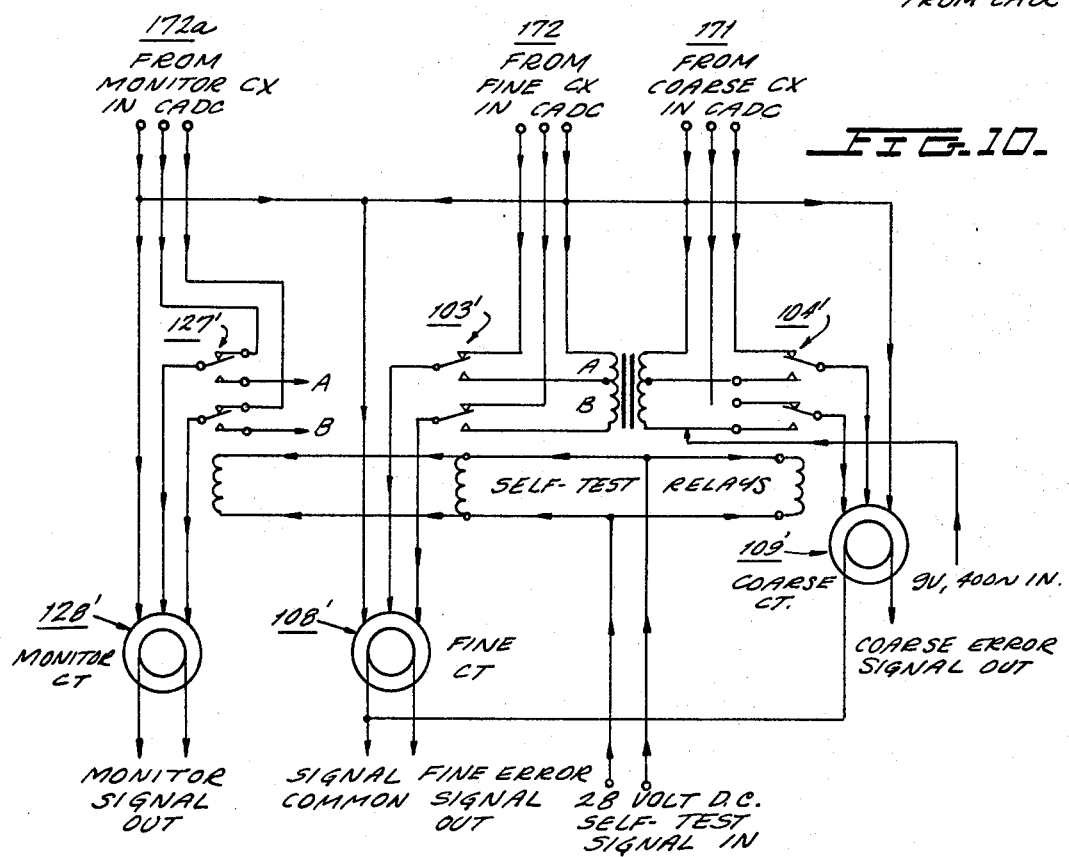

May 7, 1968 J. M. OHNIKIAN ET AL 3,381,656
VERTICAL SCALE INDICATOR
Filed June 30, 1965 12 Sheets-Sheet 10

INVENTORS
HERBERT B. STOLOVE
JOSEPH M. OHNIKIAN
BY
OSTROLENK, FABER, GERB & SOFFEN
ATTORNEYS

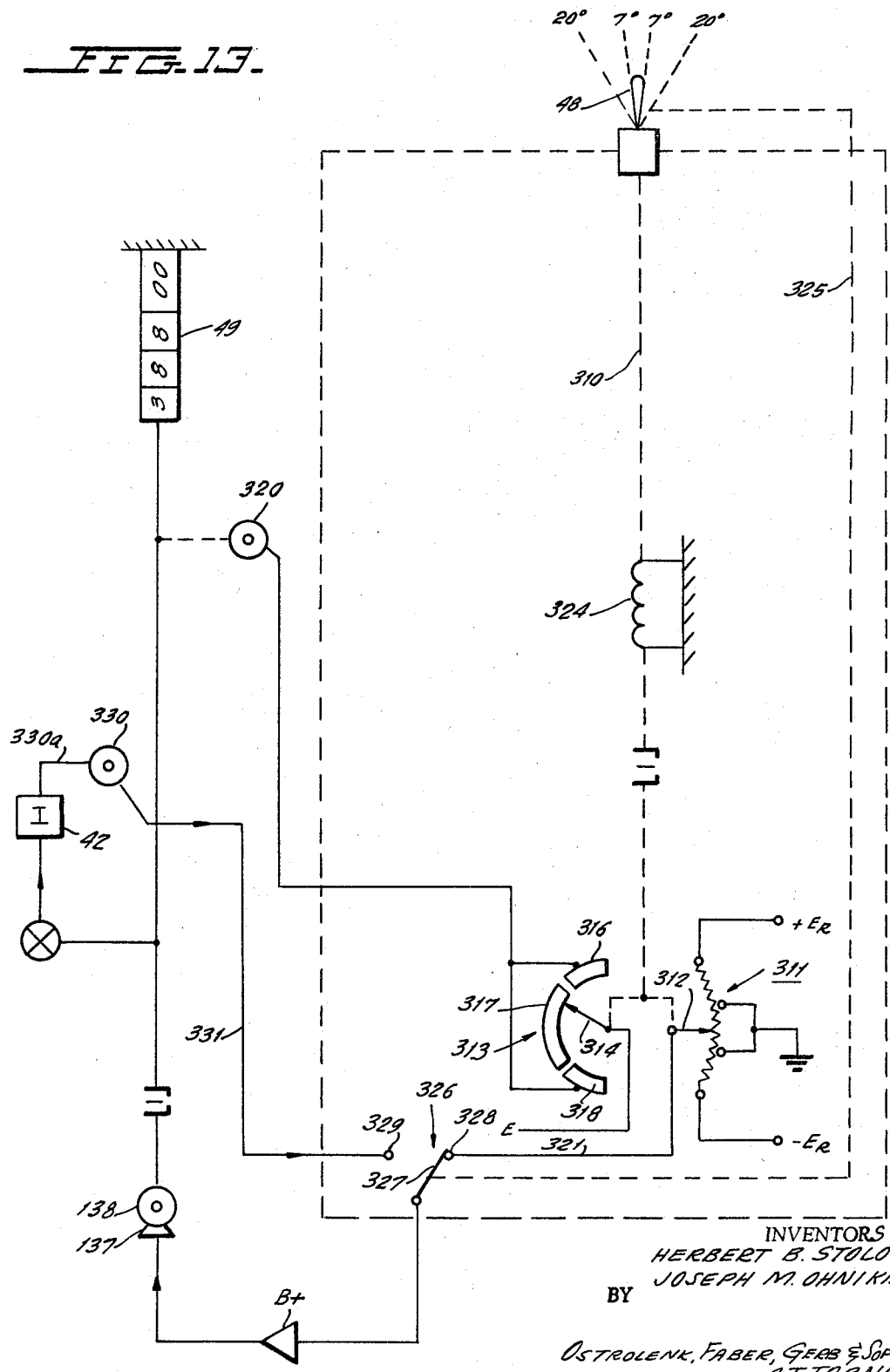

United States Patent Office 3,381,656
Patented May 7, 1968

3,381,656
VERTICAL SCALE INDICATOR
Joseph M. Ohnikian, Kingston, and Herbert B. Stolove, Flushing, N.Y., assignors to Kollsman Instrument Corporation, Elmhurst, N.Y., a corporation of New York
Filed June 30, 1965, Ser. No. 468,502
12 Claims. (Cl. 116—129)

ABSTRACT OF THE DISCLOSURE

This disclosure broadly teaches a vertical scale indicator in which a plurality of reading such as, for example, altitude, air speed, rate of climb, and so forth, may be viewed through the window of an instrument by means of open loop tapes having graduations cooperating with a stationary reference line to permit quick and simple observation. If a particular command reading is desired to be compared with the actual conditions, a movable command marker is provided which moves into alignment with the particular reading of the movable tape associated with the command reading. If the reading of the movable tape moves out of view, the command marker is operated so as to be movable only to the upper or lower extremes of the window. An intermittent motion mechanism stores the remainder of the reading. The command marker will again be moved into alignment with the movable tape when the command reading again is visible in the window by means of the intermittent motion mechanism.

---

Means are provided for driving the tape supply reels and take-up reels at the same rate of speed as the drive sprockets by compensating for the enlarged or diminished reel diameter resulting from the tape being wound or unwound from the reels. The command marker is mounted to a closed loop tape secured at its opposite ends to two separate pulley means designed to experience some rotation relative to one another to prevent the tape from becoming so taut as to tear as well as to prevent the tape from buckling.

Movement of the command marker may be done at high speed by moving a toggle switch so as to move the command marker at a high rate of speed. If a very fine reading is desired, the toggle switch may be moved to a second position which advances or reverses the command marker through single small incremental amounts so as to permit highly accurate positioning of the command marker while at the same time allowing the command marker to be moved at relatively high rates of speed in an effort to zero in on a command marker reading. The toggle switch is provided with a third position in which the command marker may be moved into alignment with a stationary reference marker.

Control circuitry is provided for assuring the fact that the tape reading at any given instant is not in error with the signal driving the tape. A predetermined signal generating means is further provided for periodically controlling the movable tape to a predetermined reading in order to ascertain the accuracy of the tape driving system.

The instant invention relates to indicating devices and more particularly to indicating devices for use in aircraft and having a vertical scale indicating arrangement for the display of air data parameters.

The art and science of aircraft instrumentation and aircraft control has been developing rapidly in conjunction with advancements being made in the field of aircraft performance. Much effort has been expended on improving the reliability and maintainability of instrument systems. It has become apparent that the separation between the capabilities of high performance aircraft and the capabilities of instruments available has been increasing.

Specific areas in which difficulties have been encountered in instrument design include the greatly increased number of instruments which now have to be incorporated into aircraft systems. At present the number of instruments required in aircraft systems are more than can be accommodated on the instrument panel. This necessitates the provision of extremely small sized instrumentation panels and further results in a generally cluttered appearance of the aircraft instrument panel. Attempts have been made to improve the situation by combining two or more instruments into a single case and improving the readability of the scales.

Flight tests and laboratory experiments have been that it is usually desirable to provide the pilot with two kinds of information, "what the aircraft is doing," sometimes called "actual performance," and "what the aircraft should be doing," called "desired performance." Showing both types of information reduces the pilot's memory requirement and enhances his judgment capability. This is a highly desirable result since judgment is one quality of the human being that cannot be provided by a machine and the release of the pilot's routine activities so as to provide additional time for the performance of judgment activities is highly desirable since judgment is one quality of the human being that cannot be provided by a machine. Careful consideration has therefore been given to the practical application of this finding.

In line with these requirements displays have been developed to satisfy the pilot's capabilities and limitations in addition to satisfying equipment needs. The pilot is thus not required to adapt himself to the display. Information is thereby displayed in terms of its use and is made consistent with its associated control movements.

The various display functions have been designed to be readily identifiable and distinguishable from one another. Instrument functions have thereby been integrated purposefully. The meaning of any one function displayed with respect to another is readily apparent and where possible, complementary. Mere combining of functions, as opposed to integrating of functions has been carefully avoided. Combination for the sake of space saving alone generally creates clutter and confusion and very seldom gives good results.

Keeping all of these above design factors in mind, as well as many other suitable advantages which accure from the device of the instant invention, there is disclosed herein vertical scale indicating instrumentation which has been specifically designed for providing altitude-vertical speed; indicated air speed; mach; angle of attack; command altitude; barometric compensation and maximum safe mach and command indicated air speed readings, all of which may be readily and simply observed and which are presented at the front face of the instrument.

The vertical scale indicating devices have been divided into two separate instruments, the first of which is referred to as the altitude-vertical speed indicator and the second of which is referred to as the indicated air speed (IAS)-mach-angle of attack indicator.

The altitude-vertical speed indicator is an instrument comprising an altitude section consisting of first and second moving tapes for indicating coarse and fine altitude readings, respectively. Each of said tapes is provided with graduated numeric indications for indicating the altitude, coarse and fine readings, of the aircraft at any given instant. Both of said tapes are designed to experience longitudinal movement relative to the front face of the instrument and cooperate with a stationary center reference line to provide the altitude reading. The coarse tape indicates the total altitude with a scale factor preferably of one inch per 1000 feet. The fine, or vernier, tape repeats every 1000 feet with a scale factor of one inch per 100 feet. However, any other graduations may be used, depending upon the type of aircraft and other needs of the user.

Input signals for the coarse and fine tapes may be from any suitable device, but preferably are taken from a command air data computer, which device forms no part of the instant invention. Basically, the command air data computer generates signals representative of the altitude readings. These signals are impressed upon servo means contained within the altitude-vertical speed indicator means for appropriately positioning the coarse and fine tapes relative to the fixed center reference line, thereby providing a visually observable altitude reading along a vertical scale.

Novel compensation means are provided for making a manual adjustment of the barometric setting in order to increase the accuracy of the altitude reading which is presented. Second manual means are provided for making a zero adjustment in order to insure the fact that the coarse and fine vertical altitude indicating tapes may be adjusted to provide a zero reading preparatory to flight operations or during flight operations, if so desired. The zero setting adjustment enables the instrument to be placed in exact alignment with the air data computer input signals. Thus any slight misindexing which may occur from one computer to another as a function of time can be simply and readily rectified in this manner.

In addition to the coarse and fine altitude indicating tapes a command air speed function is also provided. By means of a slew switch a command vertical altitude servo system is placed into operation in order to actuate a command air speed marker which is comprised of marker, or indicator means secured to an endless tape and which cooperates with the fine altitude tape to indicate the command value impressed upon the indicator means by the slew switch means. A separate counter means is also provided which is controlled by the operation of the slew switch and command altitude servo means to provide a continuous, visually readable numeric indication of the command altitude. The command altitude marker is operated so as to be movable only within the upper and lower visible limits of the coarse altitude tape. Since the command altitude may be a value which is not visible on the coarse altitude tape, an intermittent motion mechanism is provided to prevent the movement of the command altitude marker to a position within the upper and lower limits of the window opening. Thus, when the command value is beyond the extent of the displayed segment of the coarse altitude tape the drive mechanism to the command altitude marker is disengaged, causing the index to remain at the window extremity while the command counter continues to be driven to the appropriate position. The remainder of the command altitude value is retained in storage. When the tape is ultimately driven to achieve the command value, the command counter remains fixed and the command value on the tape arrives at the window extremity. At this point the command marker begins to move simultaneously with the course altitude tape to the center reference line. At the center reference line the tape, marker and counter will all indicate the command value.

The slewing speed imparted to the command marker will be proportional to the amount the slew switch is depressed.

The slew switch is operative in three distinct manners so as to provide plus (+) or minus (−) unit command inputs, plus (+) or minus (−) command inputs and a unit detent feature. The slew switch handle is pivotally mounted so as to be manually movable with the free end of the handle tracing an arc. Movement toward the upper and lower extreme positions of the arc through which the handle may move provides a continuous, relatively high rate of slewing for movement of the command altitude marker to any desired position. Movement of the slew switch handle at a predetermined arc length or angle less than the upper and lower limits of movement provides a relatively low rate of slewing so as to operate the command marker servo system to advance or diminish the command input by a substantially small amount as opposed to driving the command marker on a continuous high rate basis. By "pulsing" (i.e., briefly tapping) the slew switch handle, very small unit advances or decreases of the command marker are easily obtained.

The slew switch handle is further arranged to pivot along a second arc which lies in a plane substantially perpendicular to the first arc described previously. Movement of the slew switch handle from its second arc performs a center lock operation causing the command marker servo system to move the command marker to the altitude tape to the reference line and place the counter means under control of the altitude indicating tapes. This thereby operates the altitude command marker counter to contain the numeric quantity equal to the altitude vertical scale reading.

Since barometric pressure-altitude readings are basic, safety of flight parameters, and since even the most well engineered and well constructed instruments have a possibility of failure, malfunctioning monitoring provisions and self-test provisions are provided in the scale indicating device.

Malfunctioning monitoring refers to the system's ability to detect whether or not the values being displayed by the tapes are in agreement with the output shaft positions in the central air data computer which is the means by which the vertical scale indicating device is controlled. Such provisions not only serve as an automatic and comprehensive surveillance for indicator malfunctions, but also serve to monitor certain types of failures which may occur outside of the vertical scale indicating device. Such failures are failures of the output synchros of the central air data computer and of all the connections and cabling from the synchro means to the vertical scale indicating devices. The malfunction monitoring system also monitors itself for proper operation.

To enable preflight confidence checks of the indicators self-test provisions are also included. Upon the actuation of an externally located self-test switch certain of the vertical scale indicator channels are subjected to a set of simulated conditions. If the steady state values of the tape indications agree with predetermined values to within given self-test mode tolerances the proper operation of the unit is thereby verified. After such a pre-flight verification the malfunction monitoring system will automatically continue to observe the indicators for proper operation and in the event of an in-flight malfunction, will display a warning indication to the pilot. Malfunction monitoring and self-test provisions are included within the pressure altitude servo loop.

The continuous operation monitoring circuit is mechanically coupled to the altitude indicating coarse tape and is electrically coupled to the electrical signal from the central air data computer, which signal represents the value to which the coarse tape should be driven. If a null value is not obtained simultaneously from these two outputs, the continuous monitoring control transformer servo will generate an output signal which actuates an indicator flag which is pivotally mounted to come into view within the display window to indicate a lack of synchronism between the coarse tape reading and the output signal from the air data computer which is an electrical representation of the position of the coarse tape relative to its center reference line. Time delay means are provided in the flag indicator circuit to prevent the generation of an error signal while the coarse tape is being driven.

The malfunction monitoring system further includes a self-test circuit arrangement which is comprised of means which are energized upon operation of the self-test initiating button to drive the altitude coarse and fine tapes to a predetermined altitude reading in order to ascertain whether the vertical scale indicating device is responding in the desired manner to signals from the air data computer. The value of the input control signals are carefully established and upon actuation of the self-test circuitry the visual observation of the altitude coarse and fine tapes immediately establishes whether this preselected reading has been obtained by the coarse and fine tapes.

The self-test feature of the continuous monitoring circuit is achieved by shifting the monitor circuit control transformer servo means relative to the servo means which controls the operation of the coarse altitude tape. Thus, when the coarse altitude tape reaches the null position the monitor servo means generates a predetermined signal. The output of the monitor servo is series connected with a stick-off voltage signal such that the signal representative of the null condition of the monitor servo will be reduced to zero by the stick-off voltage. If either of these voltages are absent, a resultant voltage is present which is sufficient to actuate the monitor flag so as to come into view within the display window of the vertical scale indicator. Thus, in addition to providing a continuous monitor function, the monitor circuit means also provides a self-test upon its own operation.

The altitude-vertical scale indicating device is further provided with a vertical speed capacity wherein vertical speed signals originating in the air data computer are used to activate a servo loop means that positions a vertical speed display tape and cooperating pointer or marker. Non-linear follow-up potentiometer means which are compatible with the required non-linear display parameters are utilized.

The vertical speed servo loop means positions a sensitive pointer that indicates vertical speed preferably over the range from ±(0–2000) feet per minute. It should be understood that the range may be varied dependent upon the type of aircraft utilizing the instrument. For values of vertical speed above 2000 feet per minute the pointer remains at the center of one of the openings at either end of the dial and points to the numbers on the tape that appear through this aperture. An intermittent motion mechanism permits the marker to remain in this position and picks it up at the proper value of vertical speed. The vertical speed tape is non-linear in operation, which permits spacing of the readings consistent with their frequency of use and which further affords the degree of precision required for read out during any particular value of vertical speed.

The vertical speed loop further contains an adjustable damping circuit which provides for variable damping to accommodate for high and low values of vertical velocity. This permits the vertical scale indicating instrument to smooth the effects of gusts and local wind disturbances on instrument readings during landing procedures. It presents a dampened indication of vertical velocity with a relatively long time constant, which however is somewhat less than the standard pneumatic rate of climb indicator. When the aircraft is in rapid dive, or climb, it is desirable to have as fast a response as is feasible. Hence, minimum damping during this operation is necessary. A zero set adjustment is provided to permit adjustment of the vertical speed index to the zero graduation.

The altitude vertical scale indicating device is provided with a double-wedge lighting arrangement employing complementary glass wedges with a small sealed air gap between the two sections. A suitable light source provided at one end of the double-wedge assembly emits light which passes through a filter into the thick side of the wedge closest to the dial. By a series of successive reflections light is controlled so that more light gets to the dial and the indicating tapes and less light is available for spill over into the cockpit areas. This provides a well lighted instrument without the disadvantages of flooding the cockpit area with unnecessary light.

The take-up spools of the lengthy coarse tapes, which are not continuous, endless tapes as is the case with the fine tapes, are confronted with the problem of developing peripheral speeds of the spool which are different from the drive sprocket for the tape which is due to the tape build-up on the spool. To compensate for these peripheral speed variations novel hair spring means are provided between the spool and its drive gear so that when the spool and its drive gear rotate at different angular velocities the peripheral speed of the spool is maintained equal to that of the sprocket. Anti-backlash springs are provided to eliminate any relative motion between the various markers and their corresponding tapes. They are located between the drive pulleys and the frame and load the gear train in one direction effectively eliminating the backlash between the pulleys and the servo drive mechanism.

The intermittent motion mechanism referred to previously is connected between the gear train of the tape drive motor and the commad marker drive spool in order to disengage the command marker when it reaches the display window upper and lower extremities. The input shaft is provided with a face cam and a gear sector such that the face cam drives an output gear into mesh with the gear sector to position the command marker for a portion of the revolution of the input shaft. Any further rotation of the input shaft disengages the output gear from the gear sector so as to prevent the command marker from moving to a position beyond either the upper or lower extremity of the window display. Rotation in the reverse direction will cause the face cam to place the output gear back into mesh with the gear sector in order to return the command marker from either the upper or lower extremity toward the center reference line. Since no slip clutches or spring loaded mechanism are required in this circuit the mechanical reliability is greatly enhanced.

The second type of vertical scale indicator is the air speed-mach-safe speed indicator means and while its basic design is substantially similar to that of the altitude vertical speed indicator means the device is designed to provide mach, safe speed indications and air speed indications with the command tape gradations and the servo and mechanical systems being so adjusted and/or selected to provide these visually readable indications under control of the suitable signals from the central air data computer. The functions, operations and design, however, of all the elements in the air speed-mach-safe speed indicator device are substantially identical to those described above for the altitude vertical speed indicator device.

Both devices, while providing for different operating conditions, together share the common features of providing a compact, reliable instrument yielding readings upon vertical scales, which readings are continuously monitored to apprise the pilot of the correct operation of the device. Adjustment mechanisms are provided in order to insure accurate cooperation between the device and the air data computer which controls its operation. In addition to providing indications of the actual operating conditions of the aircraft, command display devices are also provided within the same instrument and are integrated into the instrument in such a manner as to make simple, rapid, comparison readings between the command and actual readings at any given instant. Both instruments are hermetically sealed in order to permit safe operation which, in turn, is unaffected by any surrounding conditions such as pressure, temperature, humidity and the like. The wedge lighting arrangement permits extremely good unstrained viewing of the instrument while providing substantially reduced spillover of light into the cockpit area by concentrating the light upon the indicator tapes and counters of the instrument which are contained within the display window.

It is therefore one object of the instant invention to provide a novel indicator device for use in aircraft and the like which provides visually observable indication on vertical scales.

Another object of the instant invention is to provide a novel indicator instrument for use in aircraft and the like and having vertical scale indicators which are continuously monitored throughout their operation so as to immediately apprise the pilot of any incorrect or faulty operation of the indicator.

Still another object of the instant invention is to provide a novel indicator device for aircraft and the like having vertical scale indicating tapes to provide visually observable readings in cooperation with a stationary center reference line and further having command markers cooperating with said tapes to permit simultaneous observance of both command readings and actual readings of the aircraft.

Still another object of the instant invention is to provide a novel indicator device for aircraft and the like having vertical scale indicating tapes to provide visually observable readings in cooperation with a stationary center reference line and further having command markers cooperating with said tapes to permit simultaneous observance of both command readings and actual readings of the aircraft and wherein the command marker devices are provided with intermittent motion mechanisms to prevent the command markers from travelling beyond the upper and lower extremities of the indicator window display.

Still another object of the instant invention is to provide a novel indicating device for aircraft and the like having visually observable vertical scale tapes and being provided with a wedge lighting assembly for suitably illuminating the indicating tapes and command markers while at the same time substantially preventing spill over of light into the cockpit area.

Still another object of the instant invention is to provide an indicator device for aircraft and the like having vertical scale tapes cooperating with a center reference line to provide visually observable readings while in flight wherein the tape mechanism is provided with novel spring means for maintaining the tape drive and the tape take up spool mechanisms at the same angular velocities.

Still another object of the instant invention is to provide a novel indicator device for aircraft and the like having visually observable vertical tape indicators cooperating with a center reference line to provide visually observable readings indicative of a variety of flight conditions and having novel self-test means for operating the indicator device to predetermined readings in order to check the instrument for proper operation.

Still another object of the instant invention is to provide novel indicator devices for aircraft and the like having vertical scale tape devices cooperating with center reference markers for providing visually observable readings of a variety of flight conditions and further comprising novel command means for operating a command marker relative to the vertical indicating tapes to permit simultaneous observation of the command marker and actual flight conditions wherein said command mechanism permits continuous movement or step-like movement of the command marker.

Still another object of the instant invention is to provide novel indicator devices for aircraft and the like having vertical scale tape devices cooperating with center reference markers for providing visually observable readings of a variety of flight conditions and further comprising novel command means for operating a command marker relative to the vertical indicating tapes to permit simultaneous observation of the command marker and actual flight conditions wherein said command mechanism permits continuous movement or step-like movement of the command marker and further being provided with a command counter means which provides a visually observable numeric indication of the command reading to permit observation of the command reading even in the case where the command marker is prevented from going beyond the upper and lower extremities of the display window.

Still another object of the instant invention is to provide a novel indicator device for use in aircraft and the like having vertical scale indicating tapes for continuously indicating a variety of flight conditions and having command marker means cooperating with the vertical scale tapes to permit simultaneous observation of both command and actual conditions wherein said command marker means is provided with a center lock operation for moving the command marker into alignment with the center reference line and operating the command counter reading so as to be identical with the tape reading of the associated condition.

Still another object of the instant invention is to provide novel indicator means for aircraft and the like having vertical scale display tapes for providing visually observable indications of a variety of flight conditions and further comprising command marker means to permit simultaneous observation of both actual and command conditions wherein said command marker means is provided with an intermittent motion mechanism for disengaging the command marker device until it reaches either the upper or lower extremity of the display window and for storing the remaining value within the intermittent motion mechanism.

Still another object of the instant invention is to provide novel indicator means for aircraft and the like having vertical scale display means for providing visually observable indications of a variety of flight conditions and further comprising a novel mechanism for producing non-linear barometric pressure adjustments.

These and other objects of the instant invention will become apparent when reading the accompanying description and drawings in which:

FIGURE 3 is a side view of the devices of FIGURES 1 and 2 showing the internal arrangement thereof with one side of the mechanism housing being removed;

FIGURE 4 shows the full wedge lighting system of FIGURE 3 in greater detail;

Figure 1:
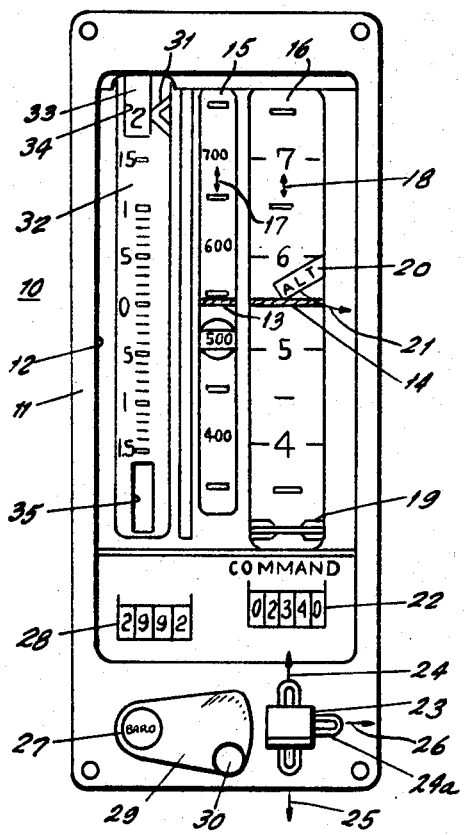
FIGURE 1 shows the front display of an altitude vertical scale indicator designed in accordance with the principles of the instant invention.
Figure 2:
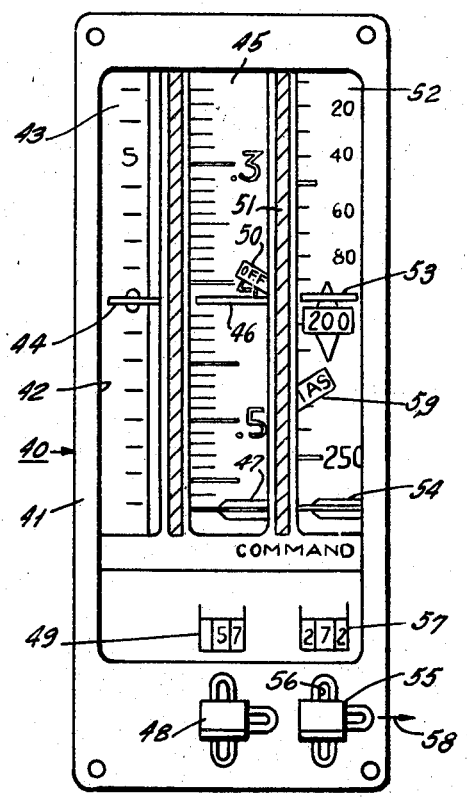
FIGURE 2 shows the front display of an air speed-Mach-safe speed indicator device designed in accordance with the principles of the instant invention.
Figure 14:
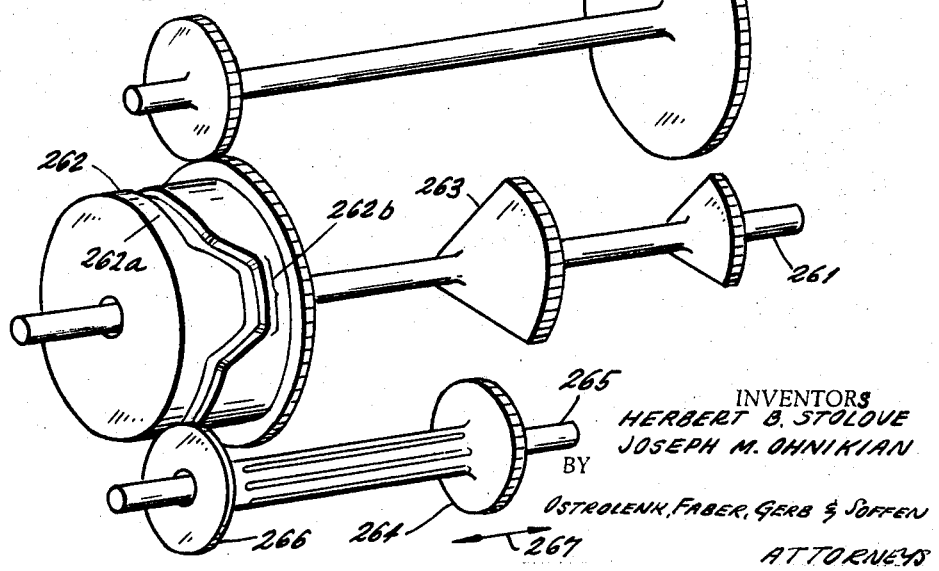
Figure 11A:
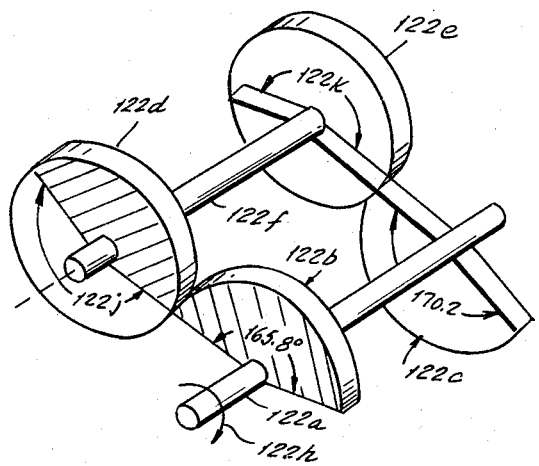
Figure 11B:
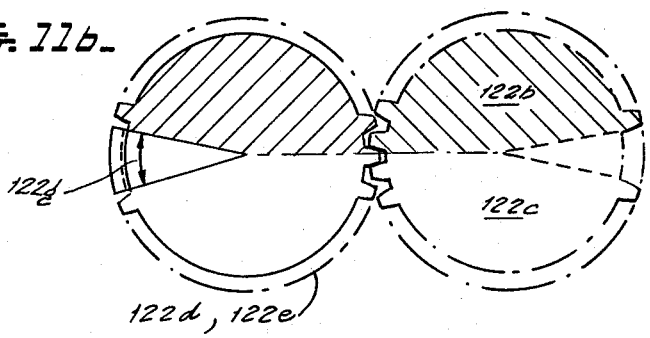
Figure 11C:
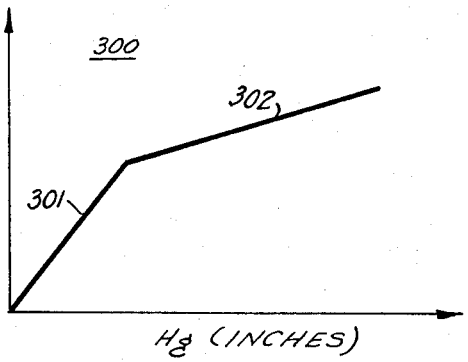
Figure 12:
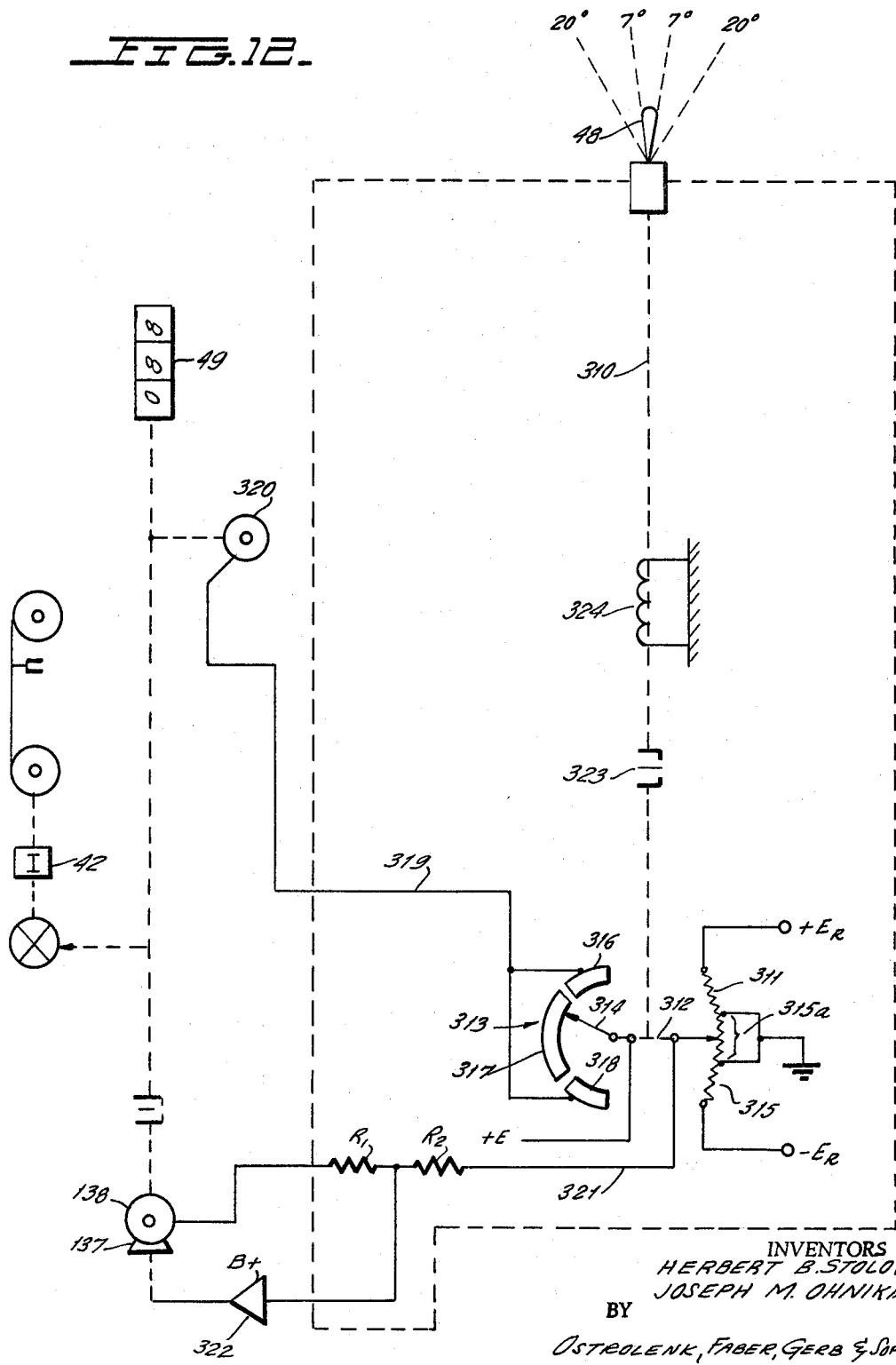

FIGURES 5a and 5a–a, when laid side by side, constitute a block diagram of the altitude and command marker mechanism of the device of FIGURE 1;

FIGURE 5b is a block diagram showing the vertical speed mechanism of the device of FIGURE 1;

FIGURE 6a is a block diagram showing the Mach number and safe speed mechanism of the device of FIGURE 2;

FIGURE 6b is a block diagram showing the indicated air speed mechanism of the device of FIGURE 2;

FIGURE 7 is a schematic diagram showing the malfunction monitoring mechanism for the air speed and Mach indicators of the devices of FIGURES 1 and 2, respectively;

FIGURE 8 is a schematic diagram of the malfunction monitoring mechanism of the altitude indicating device of FIGURE 1;

FIGURE 9 is a schematic diagram showing the monitor circuit of FIGURES 7 and 8 in greater detail;

FIGURE 10 is a schematic diagram showing the self-test circuitry of FIGURES 7 and 8 in greater detail;

FIGURE 11a is a perspective view showing the altitude correction mechanism in greater detail than in the presentation of FIGURE 5a;

FIGURE 11b is an end view of the barometric pressure compensation device of FIGURE 11a;

FIGURE 11c shows the altitude correction curve which the altitude correction mechanism of FIGURES 11a and 11b is designed to emulate;

FIGURE 12 shows the command Mach number mechanism partially in schematic and partially in diagrammatic form with the showing therein being greater in detail than that of FIGURE 6a;

FIGURE 13 shows the command altitude and command indicated air speed mechanism partially in diagrammatic and partially in schematic form showing the mechanism in greater detail than that showing of FIGURES 5a and 6b, repsectively;

FIGURE 14 is a perspective view showing the intermittent motion mechanism of FIGURES 5a and 6b in greater detail;

FIGURE 15 is a perspective view of the take-up spool arrangements for the vertical scale tapes of FIGURE 3; and FIGURE 16 is a perspective view of the wire drive spools for the command marker mechanism shown in FIGURES 5a–6b, repsectively.

Referring now to the drawings, FIGURE 1 shows the front display for an altitude vertical scale indicator device 10 which is comprised of a housing 11 having a display window or opening 12 to view the indicating devices contained within the housing 11. The altitude indication or reading is provided for by means of stationary center reference lines 13 and 14 which are rigidly mounted within the housing and which cooperate with the vertically moving tapes 15 and 16, respectively, to provide the altitude reading.

The tape 16 provides the coarse altitude reading and is movable in either the upward or downward direction as shown by arrows 18. The coarse tape 16 indicates the total altitude with a scale factor of one inch per 1000 feet. For example, with the reading given in FIGURE 1, the position of the tape 16 relative to the center reference line 14, yields a reading of approximately 5500 feet. The fine, or vernier tape 15 is an endless tape, as will be described in greater detail and repeats every 1000 feet with a scale factor of one inch per 100 feet. Considering the position of fine tape 15 relative to center reference line 13, it can be seen that the reading is 540 feet. Therefore, the combined reading presented by the coarse and fine tapes 16 and 15, respectively, relative to their cooperating center reference lines 14 and 13, respectively, would be 5540 feet for the position of the tapes of FIGURE 1.

The tapes 15 and 16 are positioned by dual speed control transformer synchro signals, to be more fully described, and which are linearly proportional to altitude. The drive mechanism, also to be more fully described, converts the rotary motion of the servo into translational motion of the tapes through a range preferably from −1000 feet to +60,000 feet at an accuracy of + or − ten feet, a sensitivity of five feet and a slew speed of 60,000 feet per minute. Since the device has a range of from −1000 to +60,000 feet, this necessitates the use of a coarse tape due to this great length. The coarse tape is not an endless tape but is a tape arrangement provided with suitable take up spools, as will be more fully described. Range and tolerances set forth above are merely exemplary and may be chosen depending upon the needs of the user.

Command information may also be inserted into the vertical scale indicator device and is presented upon the display by means of a command marker 19 and a command counter 22, which marker and counter are controlled by the slew switch means 23. The command marker 19 is operated by activating slew switch 23 and may be moved vertically upward or downward relative to the coarse tape 16. Since movement beyond the upper and lower extremities of the window 12 would completely conceal command marker 19, an intermittent motion mechanism, which will be described more fully, operates so as to enable the command marker 19 to move to either the upper or lower extremity, to then be disengaged from any further movement so as to be concealed and acts to store the remaining value which the command marker would preferably like to indicate. Any command value which is inserted into the indicator device 10, however, is continuously displayed by the counter means 22 so that even though the command marker 10 moves to the upper or lower extremity of window 12 the command reading is still nevertheless visually observable by means of the counter 22. In the case where the command marker has moved to the lower extremity of the window 12, for example, and the remaining portion of the reading is stored by the intermittent motion mechanism and subsequent thereto is operated in the reverse direction the intermittent motion mechanism will first reduce the value stored within the mechanism to zero before operating the command marker 19 to move from the lower extremity toward either the center reference line or the upper window extremity, for example. In any case, it should be noted that the command counter 22 will contain the exact command reading at any given instant. The marker and counter are operative by means of moving the slew switch 23. By moving the slew switch 23 in the upward vertical direction, as shown by the arrow 24, this moves the command marker vertically upward. By moving the slew switch 23 in the downward vertical direction, as shown by arrow 25, this moves the command marker 19 in the downward vertical direction. The slew switch 23 is normally biased so as to remain in the central position, as shown in FIGURE 1, when not being operated. Slew switch 23 is so designed that when it is moved to its uppermost position, continuous operation of the command counter 22 and command marker 19 is achieved. By "pulsing" the slew switch 23 to a predetermined position less than its upper limit, the command counter 22 and command marker 19 is operated in a step-like fashion. By using the "pulsing" method individual units or digits can be indexed on the counter.

A center-lock operation may be performed by moving slew switch 23 from its neutral position to the right, in the direction shown by arrow 26. This operation, which will be more fully described, moves the command marker 19 into alignment with the center reference line 14 and causes the command counter 22 to move to the same identical reading as that which the coarse and fine tapes 15 and 16, respectively, are positioned. For example, in the case of the position of taps 15 and 16 in FIGURE 1, the command marker 19 under control of the center-lock operation will move into alignment with the center reference line 14 and the command counter will contain the reading 05540, which is the reading of the coarse and fine tapes 15 and 16, respectively.

The front display is further provided with a barometric setting knob 27 which is designed to rotate about its central axis in order to manually set the barometric pressure correction. The manual barometric correction knob 27 operates a counter 28 which indicates the barometric pressure reading to which it has been set under control of the barometric correction knob 27. The barometric correction is coupled to the servo system to change the tape displacements of coarse and fine tapes 16 and 15, respectively, by the necessary compensation factor for the non-linear altitude barometric pressure relationship.

The front display is further provided with a slidable plate 29 having a handle 30 and which is designed to pivot about the axis of the barometric setting knob 27. When rotated counterclockwise from the position shown in FIGURE 1 the plate 29 uncovers a zero setting control means which preferably is rotatable through the insertion of a screw driver (not shown) to permit the performance of a zero setting adjustment in order to provide the exact alignment of the altitude tape so that they correspond to the input signals from the air data computer which is employed to control the operation of the vertical scale indicator. Thus, any slight misindexing that may occur from one computer to another can be rectifiied in this manner. Both the barometric knob 27 and the zero set input, which is positioned beneath the rotatable plate 29, are transmitted through the housing 11 by a suitable hermetic seal in order to prevent the vertical scale indicating device from being affected by exterior conditions.

While the central air data computer will not be described as part of the instant invention, it is sufficient to understand that this computer is provided in the aircraft and operates to generate electrical signals representative of the various readings which the vertical scale indicating device is designed to display.

The vertical scale indicator 10 of FIGURE 1 is further provided with a vertical speed display comprised of a sensitive pointer 31 designed to move in the vertical upward or downward directions so as to cooperate with the stationary portion 32 of the display and with the movable tape portion 33 of the vertical speed display which is selectively visible at either the upper or lower windows 34 and 35 positioned immediately above and immediately below, respectively, the stationary portion 32 of the vertical speed display. The pointer 31 indicates vertical speed preferably over the range from zero to + or −2000 feet per minute. For values of vertical speed above 2000 feet per minute sensitive pointer 31 remains at the center of one of the windows 34, 35 and points to the numbers on the tape 33 that appear through one of the windows. An intermittent motion mechanism which will be more fully described permits the marker to remain in this position and picks it up at the proper value of vertical speed. The vertical speed tape 33 is operated in a non-linear manner, which permits the spacing of the readings consistent with their frequency of use and which affords a degree of precision required for read-out during any particular value of vertical speed. As can clearly be seen, the vertical speed indicator preferably provides gradations of approximately one inch per 1000 feet for the first 1000 feet with the gradations becoming diminished in the range from 1000 feet −2000 feet. With the display as shown in FIGURE 1, it can be seen that the vertical speed is indicated at its positive maximum, namely +2000 feet per minute. If, for example, the vertical speed of the aircraft were to diminish from the 2000 feet per minute condition, the sensitive pointer 31 would remain at the upper extremity, as shown in FIGURE 1, until the diminishing vertical speed is reduced to a point close to 1500 feet per minute. At this time the sensitive pointer 31 becomes operative and moves vertically downward and into alignment with the gradation 1.5 and thereby away from the upper window 34. In the region from +1500 feet per minute to −1500 feet per minute the pointer 31 cooperates with the stationary portion 32 of the vertical speed indicator.

FIGURE 2 shows the front display of the indicated air speed Mach and an angle of attack indicating device 40 comprised of a housing 41 having a window 42. A first tape 43 is provided therein along the left-hand side of window 42 which is designed to be moved vertically upward or downward and which cooperates with a center reference line 44 to provide an angle of attack reading. Readings above the zero gradation on tape 43 indicate positive angles of attack and readings below the zero gradation indicate negative angles of attack. The tape 43 is preferably provided with a range from −10° to +25° and has a tolerance of ±.25 inch and a slew speed of 420° per minute with the range and tolerance being dependent upon the needs of the user. As shown in FIGURE 2, the tape 43 relative to its center reference line 44 provides an angle of attack reading of zero.

The Mach reading is provided by means of a tape 45 which cooperates with a fixed center reference line 46 to provide the Mach reading. The tape provides readings preferably through a range of 0.2 to 1.0 Mach, with a tolerance of ±0.005 Mach and a slew speed of 12 Mach per minute again being adjustable depending upon the type of aircraft. The Mach number is in indication of the normalized speed of the aircraft relative to the speed of sound. For example, Mach 1 represents the speed of sound which is approximately 600 m.p.h. (depending upon atmospheric conditions, altitude, et cetra), while a reading of Mach 0.5 represents a speed of approximately 300 m.p.h. The tape 45 is arranged to be moved vertically downward or upward, relative to the center line 46, to provide Mach readings. In FIGURE 2 the reading, for example, is 0.41 Mach.

A command marker Mach function is also provided in the instrument 40 and is comprised of a command Mach marker 47 which is coupled to a hidden tape, to be more fully described, so as to move vertically upward or downward but within the upper and lower extremeties of the window 42. The command marker 47, much like the command marker 19 of FIGURE 1, is operated by an intermittent motion mechanism which will be more fully described so as to permit movement of the marker 47 within the window extremities to disengage the marker 47 when it reaches either extremity and to store the remaining value within the intermittent motion mechanism until such time that the command marker 47 returns to a reading which is visible and which is contained within the window extremities. The command marker 47 is operated by a slew switch 48 which when moved vertically upward operates the command marker to move vertically upward and when manually moved vertically downward, in turn, operates the command marker 47 to move vertically downward.

Cooperating with the command marker 47 is a Mach counter 49 which provides a Mach reading at any given instant of the command Mach which is being impressed upon the instrument 40 by means of the slew switch 48. As was the case with the device of FIGURE 1, the command Mach counter 49 always provides the command Mach reading at any given instant even in the case where the command Mach marker 47 has been driven to either the upper or lower window extremities and is disengaged due to the fact that its appropriate position with the tape would conceal it from the viewer's eye. For example, in the presentation of FIGURE 2, with a Mach reading in counter 49 of 0.57, the command marker 47 shows the reading 0.57 correctly. However, if the slew switch 48 were operated to present a command Mach reading of 0.59, for example, it can be seen that command marker 47 would be disengaged from any further movement in the downward vertical direction with the remaining portion of the reading, namely 0.03 being stored in the intermittent motion mechanism which drives command marker 47 in a manner to be more fully described. If the tape 45 were moved vertically upward so as to bring the reading 0.59 Mach within view of the window display, command marker 47 would then be operative to move to this command reading.

In the case of a power failure, either generally within the aircraft, or specifically a power failure to the vertical scale indicator 40, this is clearly indicatable by means of a flag 51 which is pivotally mounted behind a vertical rib 50 so as to come into view in order to display the word OFF indicative of the fact of a power failure. The power failure indicator flag 51 is designed so as to be normally biased to move to the position shown in FIGURE 2. However, with power being normally supplied, a suitable solenoid (not shown) becomes energized to pull flag 51 in and behind vertical rib 50 so that it is out of view, providing an indication that normal power is being provided to the vertical scale instrument 40.

The slew switch 48 operates to move the tape 45 vertically upward or downward in such a manner that the further down the slew switch 48 is depressed the faster the command marker will move. If it is depressed only slightly in the downward vertical direction, the slew speed will be substantially less than if it is depressed the maximum amount, thereby providing a certain measure of control over the slew speed of the command marker 47.

The instrument 40 is still further provided with a tape 52 designed to move vertically upward and downward and to cooperate with a center reference line 53 to provide an indicated air speed reading. The moving tape 52 has a scale factor of 1.25" per 50 knots and is capable of providing readings through a range of 50–600 knots with an accuracy of one knot and a slew speed of 2750 knots per minute. As one example, the reading of FIGURE 2 displays an indication of 190 knots. As is well known, a knot is one manner of measuring speed and is approximately 1.1 miles per hour.

A command air speed function is also provided and is comprised of a command air speed marker 54 which is operated by an intermittent motion mechanism referred to above which moves the command air speed marker 54 vertically upward and downward within the limits of the upper and lower extremities of window 42. A command air speed marker 54 is under control of a slew switch 55 which is pivotally mounted so that when it is moved in the upward vertical direction it causes command marker 54 to move vertically upward and when slew switch 55 is moved in the downward vertical direction it causes command marker 54 to move downwardly. Also cooperating with the marker 54 is a counter 56 which is under control of slew switch 55.

Slew switch 55 is provided with capabilities such that, if it is moved in the upward direction to its limiting position (controlled by the slow 56), continuous slewing of the command marker 54 will occur. If slew switch 55 is moved to a position slightly less than the upper extreme position unitized or step-like slewing or movement of the command marker 54 can be obtained by pulsing the switch. In a like manner, if the slew switch 55 is moved to the extreme downward vertical position continuous slewing will occur, whereas if it is pulsed to a position slightly less than the extreme downward posisition, unitized discrete stepping of command marker 54 occurs.

The slew switch 55 is also movable in the horizontal direction, as shown by arrow 58, to provide a centerlock feature. When slew switch 55 is so operated the centerlock feature causes the command marker 54 to move into alignment with center reference line 53 and also cause the indicated air speed command counter 57 to be operated so as to contain the identical reading which the movable tape 52 provides in cooperation with its center reference line 53.

FIGURE 3 shows the inner construction of the indicators 10 and 40 of FIGURES 1 and 2, respectively. For clarity purposes, the items will be designated by the numerals for the indicator 10, but it should be understood that both devices 10 and 40 have substantially the identical design shown in FIGURE 3.

The indicator device 10 of FIGURE 3 shows a sectionalized portion of the housing 11 in a side elevational view and having a window 12 to permit the display of the tapes mounted within the housing 11. The window 12 is formed in a flange member 12a which is hermetically sealed to the housing portion 11. Window 12 is sealed by a wedge assembly comprised of a lighting wedge member 61 and a light reflection wedge member 62. Light reflection wedge 62 is hermetically sealed to flange 12a by means of a suitable sealing agent 63 in order to prevent any contamination of the unit by exterior influences. Lighting wedge 61 is mounted to and spaced from light reflection wedge 62 by means of the sealing material at the upper and lower edges 63a and 63b, respectively. The wedge assembly is further secured at its lower end by means of an element 65 having a shoulder abutting a cooperating shoulder of the flange 12a and is, in turn, maintained in this position by means of a wedge retainer 66 secured by suitable fastening means 67. A lamp assembly 68 is provided at the upper end of lighting wedge 61 and contains a suitable light source such as, for example, a lamp. The light from the lamp, or lamps, passes through a filter 69 mounted between assembly 68 and lighting wedge 61 and into the thick side of the lighting wedge 61 closest to the tapes. By a series of successive reflections a ray of incoming light builds up its angle of incidence to the surface it strikes until the light ray finally emerges from the lighting wedge 61. At this time the angle of incidence is greater than the angle of reflection, allowing the ray to escape through both front and rear surfaces 61a and 61b, respectively, of the wedge 61. The front or light reflection wedge 62 redirects the light and some light rays entering the front wedge eventually find their way back to the dial. Thus, more light gets to the dial and tapes where it is desired and less light is available for spillover into the cockpit area. The amount of light spillage from the instrument 10 can also be improved by optimum selectiton of wedge angles and relative positioning of lamps and wedges.

By bringing the light source close to the chamfered top of the inner wedge and by use of the appropriate lamps an efficient utilization of light is obtained. This also results in a much thinner inner wedge 61 which by reducing the depth from the bezel to tapes makes the tunnel effect less, thus increasing the efficiency of panel space utilization.

The inner surface 61b of lighting wedge 61 is provided with an aperture mask 70 which frames the entire rectangular periphery of the inner wedge 61.

The hermetic sealing of the wedge assembly improves life and reliability of the instrument by eliminating exposure of the internal mechanism to the environmental influences. The hermetic sealing process results in a permanently closed air-tight seal between vitreous and/or metallic materials and does not include seals accomplished by gaskets and mechanical pressure. The instrument 10 is filled to one-half to one atmosphere, with a helium-nitrogen mixture. Considerations assuring structural integrity and maximum strength to weight ratios are provided. The seal is designed such that the variatiton of forces experienced by the housing 11 as a function of changes of ambient pressure with altitude will not workharden, thus cracking and destroying the seal. The above sealing requirements are merely exemplary and depend only upon the need of the user.

The moving tapes such as, for example, the tape 16, shown in FIGURE 3, is preferably formed of "Gentape," which is a plastic-impregnated-woven glass fiber driven by the rotatable drive sprockets 71. The surface coating of the tapes are black nylon upon which the white markings are printed and then overcoated by a coat of clear nylon which forms a perfect bond with the black nylon. The overcoating improves abrasion resistance considerably. Since the tape 16 is approximately 61" in length, take-up spools 72 are provided for winding the unused portions of the tape. The effective diameters of the take-up spools vary with the amount of tape wound upon them, hence, if the spool is geared directly to the drive sprockets 71 the peripheral speeds of the spool and sprocket will be different, resulting in excessive slack or tearing of the tape. To compensate for these diameter variations means to be more fully described, and which are located between the spool and its drive gear, maintain the peripheral speed of the spools 72 equal to that of the drive sprocket 71.

To understand the operation of the tape drive, let it first be assumed that the tape is to be moved in the direction shown by arrow 79. It can be seen that the gear for the take-up spool 72a is meshed to the gear for drive sprocket 71a, as is the gear for take-up spool 72b meshed to the gear for drive sprocket 71b. In a similar manner, the gears for drive sprockets 71a and 71b are meshed to one another.

In order to move the tape 16 in the direction shown by arrow 79 drive sprocket 71a is rotated in the direction shown by arrow 80. This causes take-up spool 72a to rotate in a direction shown by arrow 81; drive sprocket 71b to rotate in the direction shown by arrow 82; and take-up spool 72b to rotate in the direction shown by arrow 83. The clockwise rotation of take-up spool 72a unwinds the tape which is advanced by means of the teeth provided on drive sprocket 71a to unwind the tape from take-up spool 72a. The teeth of drive sprocket 71b causes the tape to move around the pulley 73, the backing plate 75 and the pulley 74 in order to be stepped around by drive sprocket 71b and ultimately wound through the counterclockwise rotation 83, about the take-up spool 72b. The pulley 84, spring biased by spring means 85, which is referred to as an anti-backlash spring, acts to load the gear train in one direction effectively eliminating the backlash between the pulleys and the servo drive.

The command marker 19 which cooperates with the moving tape 16 is rigidly secured to a tape 86, referred to as the command index ribbon which has its opposite ends secured to the command ribbon drive and storage spool 77 by means of a notch 77a provided therein. If it is desired to move the command marker 19 in the direction shown by arrow 87 this is performed by moving the command ribbon drive and storage spool 77 in a direction shown by arrow 88 so as to move around the pulleys 73 and 74 and to have its opposite end wound about the storage spool 77. Since the command index ribbon 86 has one end thereof wound about the storage reel 77 at the same speed at which its opposite end is unwound from the spool 77 any backlash is virtually eliminated, during the operation of the command marker 19.

FIGURE 4 shows the wedge assembly 60 in greater detail with the lines 89 indicating the path of the light rays. The light from the lamp assembly 68 passes through the filter, previously mentioned, and into the thick side of the wedge 61 closest to the tape. By a series of reflections from the boundary surfaces 61a and 61b of the inner wedge 61 the ray of incoming light builds up its angle of incidence to the surface it strikes until the light ray finally emerges from the wedge such as is shown at 90. At this time the angle of incidence is greater than the angle of reflection, allowing the rays to escape through both front and rear surfaces of the wedge 61 at 90 and 91, respectively. The front wedge, or light absorption wedge 62 redirects the light and some light rays entering the front wedge eventually find their way back to the interior of the display such as by the reflection occurring at 92.

FIGURE 5a is a block diagram showing the mechanism utilized for providing the coarse and fine altitude displays. As was previously described, the altitude display system is comprised of fine and coarse tapes 15 and 16, respectively, and is further provided with a command altitude marker 19 secured to the command index ribbon 86. The command marker 19 has an associated counter 22.

The altitude moving tapes are actuated by a servo system comprised of a two-speed synchro input signal 101 and 102 utilized for activating the altitude servo system 100. The fine and coarse altitude signals are developed in a central air data computer which forms no part of the instant invention. It is sufficient to understand, however, that the central air data computer is provided with at least an output shaft which rotates by an amount representative of the altitude value and its change in value at any given instant. To this shaft is affixed first and second synchro devices which are designed to generate fine and coarse electrical signals representative of the rotation of the shaft previously mentioned. The mechanical linkages coupling the first and second synchros to the rotating shaft provide a speed ratio between the two synchros. Preferably, this speed ratio is 27:1 such that a first synchro will rotate 27 times for one complete rotation of the second synchro, thereby making the synchro which rotates the higher proportion of times that synchro which develops the fine altitude signal. While the second signal can be considered to develop the signal referred to as the coarse altitude signal these signals can be likened to the hour and minute hands on a clock wherein the hour hand while giving an indication of the number of minutes which expires between any two given hours around the clock face, may nevertheless be compared in conjunction with the minute hand which gives a more accurate indication of the number of minutes which elapses between any two given hour positions. Thus, this arrangement provides signal means for driving the altitude tapes 15 and 16 to yield an altitude reading of a high degree of accuracy.

The fine and coarse altitude signals appearing at 101 and 102, respectively, are impressed upon the relays 103 and 104, respectively. These relays are comprised of a pair of contacts which are normally closed during regular operation of the indicator device, but which are operated to the open position to isolate the fine and coarse altitude signals during the self test procedure, to be described subsequently.

The fine and coarse signals are passed by the relays 103 and 104 when operating in a normal fashion and are impressed upon the differential synchro devices 105 and 106, respectively. The differential synchros 105 and 106 are mechanically linked as designated by the dash line 107 for a purpose to be more fully described and are further electrically designed so as to maintain a 27:1 rotational ratio therebetween for the same reasons as were previously described.

The differential synchro means 105 and 106 have their electrical outputs coupled into fine and coarse synchro devices 108 and 109, respectively. The output of fine synchro 108 becomes one input of an electrical summing circuit 110, the output of which is connected to one input of a two-speed switch means 111. The electrical output of fine synchro 109 is connected to a second input of two-speed switch 111. Two-speed switches are well known in the art and operate in such a manner as to limit the fine synchro signals within a range from 0 to 400 millivolts and limit the coarse synchro electrical output in a range from 400 to 800 millivolts. Thus, any fine synchro signals generated by the fine synchro 108 and which lies within the range of 0 to 400 millivolts will be passed by two-speed switch 111 to an amplifier means 112. Any fine synchro signal above the limit of 400 millivolts will be shown at L. Coarse synchro signals generated by synchro means 109 cannot be passed unless the signal lies within the range from 400 to 800 millivolts and if it exceeds 800 millivolts will be shown at L. The resultant signal passed by two-speed switch 111 and amplified by amplifier means 112 is impressed upon motor means 113 which follows the signal by rotation of its armature which is coupled through mechanical linkage 114 to generator 115. The generator 115 generates a signal impressed upon the second input of the summing circuit 110 which may also be referred to as a different circuit so as to completely cancel out the altitude signals received from the transmitter means in order to "null" the altitudes synchro loop. The rotation of the motor 113 is also imparted through a slip clutch 116 and a stop means 117 through the drive sprockets 118 and 119 which is similar to the drive sprockets 71 shown in FIGURE 3, which act to move the coarse and fine tapes 16 and 15, respectively. The stop means 117 is well known in the art of servo systems and operates so as to prevent movement of the drive sprockets 118 and 119 as the coarse and fine tapes move to a position close to being completely unwound. Stops are provided to prevent rotation at both extremes of the unwinding of coarse and fine tapes 15 and 16. The slip clutch 116 operates so as to permit the rotation of motor means 113 to terminate rotation without coming to an abrupt stop. The slip clutch 116 is designed in the instant invention preferably to permit slippage between the shaft 114 of motor 113 and the drive sprockets 118 and 119 when a load torque of approximately two inch-ounces is achieved.

The manual barometric setting which may be imposed upon the servo system 100 is comprised of the manually operable knob 27 which is also shown in FIGURE 1. A mechanical coupling means 27a is provided to connect the knob 27 through a suitable hermetic seal to the slip clutch 120 and stop means 121. Slip clutch 120 and stop means 121 is substantially identical in function and design to the slip clutch 116 and stop means 117, respectively. The slip clutch permits slippage to occur between the manually operable barometer control knob 27 and the counter means 28 when the uppermost and lowermost extreme counts of the counter is achieved. The mechanical linkage is then coupled through a non-linear compensation means 122 at the appropriate barometric adjustment into the fine and coarse altitude readings. The counter 28 provides a reading in inches of mercury. As is well known in the aircraft field, the relationship between inches of mercury to altitude measured in feet is not a direct relation. Actually the pressure gradient decreases non-linearly with increase in altitude so that this non-linear conversion must be provided for when this function is performed by the non-linear compensation means which is shown in FIGURE 11a and will be discussed subsequently in greater detail. The output of the non-linear compensation means is impressed upon a mechanical differential means 123. The output of the mechanical differential means is mechanically coupled to a differential synchro 124 and is further mechanically coupled to the fine and coarse differential synchros 105 and 106. This alters the electrical angle of synchros 105 and 106 and thereby introduces the barometric adjustment into the altitude servo system 100.

The zero adjust means which permits adjustment for synchronism between the vertical scale indicator device and the central air data computer is comprised of a screw head 29a adaptable for receiving a screw driver in order to make the adjustment and which lies beneath the pivotal plate 29, shown in FIGURE 1. This is coupled through a coupling means 29b which provides an hermetic seal and mechanical coupling between the adjustable screw head 29a and a slip clutch means 125 and is substantially identical in function and design to the coupling 27a. Thus, the zero adjust screw is mechanically coupled to the slip clutch 125 and stop means 126, both of which are substantially identical in design and function to slip clutch 120 and stop means 121, respectively, the basic function being to prevent twisting or rotation of the adjustable screw head beyond its maximum limits.

A mechanical coupling is linked to a second input of mechanical differential means 123 so as to be impressed upon a differential synchro 124 and differential synchros 105 and 106 through the mechanical coupling therebetween. The differential mechanism 123 is a mechanical summing (or difference) means which provides a mechanical output which is the sum (or difference) of the mechanical inputs. Such mechanical differentials are well known in the art and are very widely used, for example, in automobiles. Basically, it suffices to understand that if both rotational inputs to the differential are in the same direction, they will sum at the output. If the rotational inputs are in reverse directions, their difference will appear at the mechanical output of the differential.

In order to perform a self-test of the altitude mechanism a self-test circuit 125 is provided. The self-test may be performed by connecting or energizing the self-test signal 126 which is connected to relays 103, 104 and 127. The presence of this signal upon the relays operates to cause relay 103 to disconnect fine altitude signal 101 from synchro 105; causes relay 104 to disconnect the coarse altitude signal from synchro 106 and operates the relay 127 to electrically connect self-test circuit 125 to differential synchro 124 as well as connecting self-test circuit 125 to the differential synchros 105 and 106 through the relays 103 and 104. The self-test circuit 125 imposes a predetermined singal representative of an altitude reading of 50,000 feet, for example. This signal is imposed upon the synchros 105 and 106 to operate the servo loop and ultimately to operate the drive sprocket 118 and 119 so as to set the coarse and fine altitude tapes to a reading of 50,000 feet. Since the voltage developed by the self-test circuit 125 is precisely known and calibrated, failure of the altitude tapes to present a reading of 50,000 feet indicates either a misalignment or a fault in the servo system. Thus a simple misalignment problem is present which may be fully compensated for by manipulating the zero adjust means 29a. If the misalignment is not corrected in this manner then it can be immediately assumed that some other fault exists in the system.

A continuous monitoring operation of the servo system 100 is provided for by the altitude monitor signal 101a which signal is identical to the fine altitude signal 101 emanating from the central air data computer. In normal (i.e., non-self-test operation) relay 127 connects the fine altitude signals from 101a through relay 127 to the electrical input of differential synchro 124. The fine altitude signal coupled with any adjustment due to barometric compensation or zero adjustment causes differential synchro 124 to develop a resultant electrical output which is impressed upon a monitoring synchro 128. Simultaneous with this operation, normal operation proceeds and the output of the fine altitude tape drive at its sprocket 129 is mechanically linked into the monitoring synchro control transformer 128. These signals are compared against one another and when a zero output develops, as will be more fully described, an amplifier 130 becomes energized to activate a solenoid 131 in order to move the flag 20 (see also FIGURE 1) into view within the window 12 of the instrument 10. When a lack of synchronism exists between the two inputs to the control transformer synchro 128 this indicates that the fine altitude tape is not following exactly the fine altitude input signals, thus providing a flag indication. In addition thereto a "stick off signal" is also employed in this circuit as will be more fully described, to provide a variety of other monitoring indications due to faulty operation of the system. Thus, if the tape jams or if any of the other components of the synchro system are faulty the continuous monitoring means will provide an immediate indication of lack of synchronism between input signals and movement of the fine altitude tape as well as providing numerous other indications, to be more fully described.

The command altitude capability of the altitude system is also shown in FIGURE 5a and is comprised of the slew switch 23 which is also shown in FIGURE 1. As was previously described, the slew switch 23 is capable of controlling the altitude command marker and the command counter in three different operating modes. As to the unit detent mode, the slew switch 23 may be moved vertically upward or downward, as was previously described. If the slew switch is pulsed through a travel of 7° upwardly or downwardly from its normal position, incremental operation will take place. In the case where the slew switches move vertically upward, the command marker will move vertically upward and in the case where the slew switch 23 is moved vertically downward the command marker, in turn, will move vertically downward.

In order to attain rate slew operation the slew switch 23 is moved either upwardly or downwardly so as to move to an arc of greater than 7° travel in either the upward or downward direction. This causes continuous slewing at a slew rate established by the amount which the slew switch 23 is moved. In other words, if the slew switch 23 is moved to its upper extreme position a faster slew rate is obtained. If the slew switch is moved just slightly greater than a travel of 7°, the rate slewing operation will take place, but at a slew rate which is substantially less than the maximum slew rate. The movement of the slew switch 23 for continuous slewing operation is coupled through a slew mechanism 144 so as to mechanically adjust a potentiometer means 145. The electrical output of the potentiometer will vary between minimum and maximum values depending upon the mechanical position to which it is rotated. The resultant output signal is impressed upon one input of the summing circuit 133 and continues through the remainder of the servo loop to move the altitude command marker in a continuous fashion until the slew switch 23 is moved back to its normal position. Release of the slew switch automatically sets it back to its normal position due to the provision of suitable biasing means to be more fully described. If the command marker is to be moved through a relatively large range the rate slewing operation may be performed until the command marker moves to a point very close to the desired command position. The desired value or reading may then be "zeroed in" by using the unit detent mechanism which operates to move the command marker through relatively small discrete amounts, thus enabling very fine adjustments of the command marker position to be made.

The slew switch 23 may be moved along the horizontal direction, as shown by arrow 26, of FIGURE 1, to obtain centerlock operation. As was previously described, centerlock operation causes the command marker 19 to move into alignment with the center reference line 14 of FIGURE 1 and further causes the counter to show the same reading which the coarse and fine tapes display. In order to perform this operation the slew switch 23, when appropriately moved, controls a centerlock mechanism 146 which controls the switch means 134; disconnects summing device 133 therefrom and connects the electrical output of the centerlock synchro means 147 through switch 134 to electrical summing means 135. In this phase the output of the synchro loop for driving the coarse and fine tapes 16 and 15 is impressed upon one input of the differential mechanism 141 and is mechanically linked through the intermittent motion mechanism 142 to the centerlock synchro 147. While this mechanical linkage is always present under non-centerlock operation, the output of the centerlock synchro 147 is isolated from the slew switch servo loop. However, during centerlock operation this electrical output is coupled into the servo loop and operates the motor generator synchros 137 and 138, respectively, to follow the electrical output of the centerlock synchro 147, thereby operating the command marker to zero-in with the center reference line and further operating the counter under control of the motor 137 to move to the exact reading displayed by the coarse and fine tapes 15 and 16, respectively.

FIGURE 5b shows the vertical speed servo system 150 of the vertical scale indicator 10, shown in FIGURE 1, and is comprised of a vertical speed input position 151 which receives a voltage signal from the central air data computer representative of the vertical speed of the aircraft. The basic function of the vertical speed indicator is to indicate drift of the aircraft and also to indicate very accurately the small changes in vertical speed which normally occur during landing and take-off operations. In such instances relatively small vertical speed changes are very significant in providing safe operation of the aircraft. In the case where an aircraft goes into a power dive or accelerates very rapidly in the vertical direction, such aircraft operations are deliberate tactical maneuvers and the vertical speed indication during such operations is not as critical as an indication of aircraft drift from a preselected course and from landing and take off procedures in which as little as five or ten feet may make the vast difference in the safe operation of this vehicle. For this reason the vertical speed indicating system 150 is provided with a moving tape having non-linear graduations such that widely spaced graduations are provided at the small readings and smaller spaced graduations are provided for larger readings.

The voltage input signal representative of vertical speed which is impressed upon the input means 151 is in turn electrically connected to one input of an electrical summing (or difference) circuit 152. The resultant signal from electrical summing circuit 152 is impressed upon an amplifier 153 which presents the amplified signal to a motor generator servo combination 154 and 155, respectively. Motor servo 154 is mechanically coupled to generator 155 and through slip clutch 156 and stop means 157 to the drive sprocket 158 for the vertical speed tape 33. The mechanical output is also coupled through the stop means 157 to an intermittent motion mechanism 159 which, in turn, is mechanically coupled to a drive sprocket 160 for the command marker tape 161 to which the command marker 31 is mounted. As was previously described, the servo loop for the vertical speed means 150 controls the vertical speed marker 31 between its upper and lower extremities within the window 12 of indicator 10, while simultaneously operating the tape 33. As was previously described, the indicator 31 cooperates with a stationary portion 32 of the visual reading between the limits of vertical speeds of +1.5 thousand feet and −1.5 thousand feet per minute. Once these limits are exceeded, the vertical speed marker 31 moves to a position adjacent either the upper or lower window 34, 35, respectively, and cooperates with the moving tape to provide vertical speed indications of greater than + or −1.5 thousand feet per minute.

As was previously described, readings beyond these limits, that is, the limits of the stationary reading portion, have graduations on the tape 33 which are spaced closer together than the graduations of the stationary portion 32 for the vertical speed reading. In order to obtain this reading, the mechanical output from motor 154 is coupled through the stop means 157 to a variable damping circuit 162 which accepts the mechanical input and which generates a non-linear output voltage which is impressed upon a potentiometer means 163 and upon the electrical summing (or difference) circuit 152 to null the servo loop.

A zero adjustment means 165, which may take the form of a manual control knob, is mechanically connected to a potentiometer 166, the electrical output of which is impressed upon the electrical summing circuit 152, in order to provide a zero adjustment for the vertical speed indicator. During operation of the vertical speed indicator if the response is not in exact alignment with the output from the central air data computer a second adjustment means 167 which may take the form of a screw having a screwdriver slot, is mechanically coupled to potentiometer 163 in order to provide further adjustment capabilities of the vertical speed means.

The intermittent motion mechanism 159 of the vertical speed 150 operates in substantially the same manner as the intermittent motion mechanism 142, previously described in a discussion of FIGURE 5a. The intermittent motion mechanism 159 operates to disengage the command marker 31 from the vertical speed servo loop, as soon as the vertical speed marker 31 reaches either the uppermost or lowermost extremity, while the intermittent motion mechanism 159 stores any remaining value within the mechanism itself.

Turning to the indicated air speed-Mach-angle of attack vertical scale indicating means 40 of FIGURE 2, its servo systems are shown in FIGURES 6a and 6b. Considering first FIGURE 6a, there is shown therein the Mach number servo system 170 which is substantially identical to the altitude servo system 100 in FIGURE 5a with the distinctions being the fact that the Mach number servo system is not provided with zero adjust or manual barometric setting capabilities and further, is not provided with a centerlock capability. The Mach number servo system 170 receives coarse and fine Mach signals at 171 and 172, respectively, which are outputs derived from the central air data computer in order to drive the Mach tape 45. All identical components of the Mach number indicating system 170 relative to the altitude indicating system 100 of FIGURE 5a have been designated by the identical numerals with the numerals being primed.

The operation of the Mach number servo system 170 is as follows:

The incoming signals 171 and 172 for coarse and fine Mach signals are connected through the relays 103′ and 104′ to fine and coarse synchros 108′ and 109′. These synchros are designed to have a 5:1 ratio, as was previously described, with reference to the altitude servo system 100 of FIGURE 5a. A resultant electrical output of synchros 108′ and 109′ passes through two-speed switch 111′ and amplifier 112′ to the motor generator servo combination 113′ and 115′ in order to achieve a null condition through the electrical summing circuit 110′. The mechanical output is coupled through slip clutch 116′ and stops 117′ to the drive sprocket 173 for the Mach tape 45.

The self-test signal means 125′ operates in the same manner as the self-test circuit for the altitude servo system 100 to move the tape 45 to a predetermined Mach number reading. This Mach number reading agrees with the Mach reading to which the self-test signal voltage is set. This thereby determines the accuracy in response to the servo system 170 to input signals representative of a predetermined Mach value.

The continuous monitoring system is substantially similar to the system 100 wherein a signal equivalent to the coarse Mach signal appears at the input 172a and is compared at the synchro 128′ to control the operation of solenoid 131′ in flag 50.

The slew switch 48, shown also in FIGURE 2, permits detent and rate slewing in substantially the same manner as that described in the system 100. By moving the slew switch 48 through a travel of a 7° or less arc, the mechanism controls the positioning of the Mach command marker 47.

To provide rate slewing operation the slew switch 48 may be moved to an arc of greater than 7° up to its maximum upper or lower extremities to control the positioning of potentiometer 145′. The operation here is similar to the system 100, with the exception that a centerlock capability is not provided herein.

FIGURE 6a shows the angle of attack servo mechanism system 180, having an input 181 for receiving an angle of attack signal from the central air data computer. This electrical signal is impressed upon a servo 182, the electrical output of which is impressed upon one input of an electrical summing circuit 183. The ouput of this circuit is impressed upon amplifier 184 and motor generator servo combination 185 and 186, respectively. The electrical output of generator synchro 186 is impressed upon one input of the electrical summing circuit 183 to develop a null condition. The mechanical shaft output of motor 185, in addition to operating generator synchro 186, is mechanically coupled through slip clutch 187 and mechanical stops 188 to the drive sprocket 189 of the angle of attack tape 43. The electrical output of generator means 186 is combined at 183 with one input of the synchro 182. Suitable adjusting means 190 are provided which may, for example, take the form of an adjustable screw means coupled to suitable potentiometer means to control the output voltage level of the summing circuit 183 in order to adjust the servo system 180 so that the performance characteristics can be adjusted.

FIGURE 6b shows the servo system 200 for the indicated air speed moving tape 52, shown also in FIGURE 2, which provides air speed readings in units of knots. The circuitry of the servo system 200 is substantially identical in design to the altitude servo system 100 with the exception that no barometric or zero setting capabilities are provided. Centerlock capabilities, however, are provided in this circuitry. Since the design is substantially identical to servo system 100 as well as system 170, like elements have been designated with like numerals and a description of the operation of this circuitry will be omitted for purposes of simplicity with the description of systems 100 and/or 170 being read directly upon the circuitry 200 of FIGURE 6b, with the exception that the information being indicated is different.

FIGURE 7 shows the malfunction monitoring provisions circuitry for the air speed and Mach channels in greater detail. Considering this system as one being employed in the Mach channel, coarse Mach signals appear at 171 while the fine signals appear at 172. The monitor signals 172a are substantially identical to the coarse signals at 171. In the normal position the relays 103′ and 104′ are in the position shown in FIGURE 7 so as to impress these electrical signals upon the servos 108′ and 109′, respectively. The output of these servos go to the two-speed switch 111′, not shown herein, but shown in FIGURE 6a, into the input 113a′ of motor means 113′, which in turn is coupled to generator 114′. The mechanical output at 114′ of motor 113′ is coupled through suitable mechanical linkage means 221 to couple this shaft output to the servos 108′ and 109′ in order to maintain the 5:1 ratio therebetween. The mechanical output ultimately reaches the drive sprocket 173 to drive the tape 45. A monitor sprocket 222 is provided which is also shown in FIGURE 6a for the purpose of mechanically linking the monitor synchro control transformer 128′ thereto. A monitor signal is coupled through relay 127′ to the electrical input to the monitor servo control transformer. The signal is impressed upon the monitor circuit 130′ employed to operate the solenoid 131′ which, in turn, controls the position of the flag 50, shown in FIGURES 2 and 6a.

The monitor synchro control transformer 128′ is placed at the same scale factor as the fine control transformer servo 108′. Under normal operation, the vertical scale indicating means positions the tapes and the servos at a value corresponding to the two-speed synchro output of the central air data computer. The monitor servo control transformer 128′ rotates by the same amount as the fine servo 108′, unless there is some failure in the mechanical connection between these two devices such as slippage or breakage of the tape, loosening of a gear or sprocket clamp or similar malfunctions.

Since the monitor servo control transformer 128′ normally receives the same electrical stator voltages as does the fine synchro control transformer 108′, and since both devices normally rotate by the same amount, the output voltage from the monitor servo 128′ should go to the null value at the same time as the output voltage from the servo 108′. If these two devices do not receive the same electrical or mechanical angles, then the monitor servo 128′ will produce an output when the fine servo 108′ output is at a null.

The output from the monitor servo 128′ is fed to a monitor circuit 130′, to be more fully described. When the input voltage to the monitor circuit exceeds a predetermined maximum the monitor circuit becomes non-conductive, removing energization from the coil 131′ of the warning flag 50 so that this flag can be pulled into view by the spring means.

In order to eliminate nuisance trips under maximum dynamic servo response conditions, a delay circuit, to be more fully described, is provided in the monitor circuit 130′ in order to delay operation of the flag means during periods when the servo means is responding to a signal from the central air data computer. For example, if the servos are subjected to a large step input as may occur under bench test or other conditions, the monitor servo 128′ will have an output which is large until the indicator servo acts to slew the tape 45 to the corresponding position. To avoid the temporary failure indication during this slew period the time delay network delays operation of the monitor circuit.

In order to invoke the self-test operating mode, a suitable self-test signal is impressed upon the relay solenoid 224 causing the relays 103′, 104′ and 127′ to connect to the self-test voltages from source 125′. This moves the tape to a predetermined mach or air speed reading, as the case may be.

The voltage impressed into the secondary winding of the transformer 223 is referred to as the stickoff voltage which is a fixed voltage added in series with the voltage output of monitor servo 128'. In order to reduce the monitor circuit input to zero in the presence of this stickoff voltage the electrical zero point of the monitor servo 128' is shifted a predetermined angular amount with respect to electrical zero point of the line servo 108'. This shift is selected so as to be equivalent to maximum trip levels which are 100 feet (or 7.20 fine synchro degrees) for altitude and four knots (or 6.67 fine synchro degrees) for air speed.

It can be seen that if either of the two voltages which normally cancel each other should go to zero, a warning indication would result. If A.C. power to the indicator should fail, then this stickoff voltage goes to zero, leaving the output of the monitor servo 128' which will cause a failure indication. Similarly, if the power to the monitor servo 128' should fail, the output voltage would be reduced to zero, leaving the stickoff voltage which would cause the failure indication. This latter feature permits self test capability of the monitor circuit. If power to the monitor servo is intentionally interrupted as, for example, by a separate, externally-located monitor self test switch (not shown), the stickoff voltage remains to cause a failure indication. In this manner, proper operation of the monitoring system can be verified. While the stickoff requirement applies only to the pressure-altitude and indicated airspeed monitors, it can nevertheless be easily incorporated into the mach monitor as well, if desired.

The response of the malfunction monitoring system to various types of failures will now be analyzed.

(a) *Tape slippage.*—As previously described, while the fine servo 108' and the monitor servo 128' are placed in the system at the same scale factor, the two servos are not directly gear connected. The fine servo is on the drive sprocket side of the tape, while the monitor servo is driven by a second sprocket which, in turn, is driven by the tape. Slippage of the tape will result in rotation of the monitor servo with respect to the fine servo. When this rotation exceeds a predetermined level, the monitor circuit will produce a failure indication.

(b) *Removal of power to monitor servo.*—This type of failure might be due to either an open or a short in the central air data computer monitor transmitter rotor, or in the source which normally provides excitation power. As previously mentioned, this power can intentionally be removed for monitor circuit self-test. If the excitation voltage across the rotor of the monitor servo should go to zero, then as previously described, the monitor synchro electrical output will go to zero. The stickoff voltage is present and the monitors will thereby cause a failure indication.

It should further be noted that the monitor servo output also goes to zero in the event of (1) the loss of either two or three stator connections, (2) the shorting together of all three stator connections, or (3) either a short or an open circuit in the rotor of the monitor servo. The presence of stick-off voltages permits indication of these types of failures.

(c) *Fine channel stator failures.*—If one fine channel stator lead opens (due to either an open servo stator winding or to a connection failure) or if any two fine channel stator leads are shorted together, then the null of the fine channel will be shifted with respect to the coarse channel null. This destroys synchronization between coarse and fine channels. When this results in an improperly positioned tape, the high outputs from the monitor servo will cause the failure indication.

If either two or three fine channels stator leads open, or if all three fine channel stator lears are shorted together, only the coarse channel remains to control the servo. The servo dead-band, with only the coarse channel in operation, will be much higher than under normal operation. Again, an improperly positioned tape results in a high output from the monitor servo and a failure indication results.

(d) *Fine channel rotor failures.*—If the fine servo rotor is either open or shorted, then only the coarse channel remains to control the servo, and a failure indication will result as explained above. If the fine servo transmitter rotor opens, the servo will again only be under coarse channel control. The effect of a shorted fine servo transmitter rotor is discussed in paragraph (g) below.

(e) *Coarse channel stator failures.*—If one coarse channel stator lead opens, or if any two coarse channel stator leads are shorted together, the null of the coarse channel will be shifted with respect to the fine channel null. This destroys synchronization between channels and results in a failure indication in the same manner as explained in paragraph (c) above in connection with similar failures in the fine channels.

If either two or three coarse channel stator leads open, or if all three coarse channel stator leads are shorted together, then the coarse channel is inoperative and the servo is under fine channel control only. Under actual aircraft operating conditions, the actual maximum rates of change of altitude, airspeed or mach will be well below the maximum servo slew rates (which are at least 60,000 feet per minute, 2,000 knots per minute, and 7.0 Mach per minute), so that the fine channel will never lose control. Under these conditions, the tapes will always be properly positioned so the monitor flag will not appear. The malfunction monitoring system will continue to observe the vertical scale indication follow-up servo while under fine channel control only, and if for any reason the fine channel should lose control, the monitor system will produce a failure indication.

If the preceding type of wiring failure occurs, but the servo is subjected to a large step input, as under bench test conditions, fine channel control only will result in the servo locking or to a position which is an integral multiple of fine revolutions from the top position.

(f) *Coarse channel rotor failures.*—If the coarse synchro rotor is either open or shorted, the servo will remain under fine channel control only. The resulting conditions are the same as explained above. If the coarse transmitter servo rotor opens, the servo will again be under fine channel control only. The effect of shorted coarse transmitter synchro rotor is discussed in paragraph (g) below.

(g) *Removal of power from fine and coarse transmitter synchros.*—In the central air data computer altitude channel, both fine and coarse transmitters are energized from the same source. Therefore, if one rotor winding is shorted, then the voltage across the second rotor also goes to zero. Also, if the excitation voltage fails due to either opens or shorts to the power supply, both transmitter synchro rotor voltages are gain reduced to zero. Thus, the vertical scale indicator follow-up servo becomes completely inoperative and, when the indicator tapes are improperly positioned by more than the predetermined amount, the high monitor synchro output voltage will result in a failure indication.

Fine, coarse and monitor synchros in the airspeed channel are all energized from the same source. When power fails due to any of the causes indicated immediately above, the vertical scale indicator follow-up servo again becomes completely inoperative, but, in this case, it is the stick-off voltage that causes the failure indication.

The fine, coarse and monitor synchros in the mach channel are also all energized from the same source, but since no stickoff voltage provisions are to be made in the mach channel, no failure indication will result from the power failure to the mach transmitter synchros.

(h) *Monitor channel stator failures.*—The effect of open circuits in either two or three monitor stator leads and of a short of all three monitor stator leads was discussed in paragraph (b) above, where a failure indication was shown to occur.

Other types of wiring failures may occur at the opening of any monitor, synchro stator lead, or the shorting together of any two monitor stator leads. Either of these failures will cause the monitor synchro null to shift with respect to the fine synchro null. A high monitor synchro output voltage then results, and a failure is indicated, even if the fine synchro is at its proper null position.

It should be noted that failure indications due to wiring failures in the monitor synchros are in one sense false indications, because the tapes are reading properly in all these cases. However, the indication does serve to warn that the complete system, including the monitoring portion, is not operating properly.

One additional type of synchro failure remains to be discussed. In the altitude channel, a differential transmitter synchro is interposed between the central air data computer output and the vertical scale indicator monitor servo, shown in FIGURE 8, which is substantially identical to the circuit 220 of FIGURE 7, but has been designated as circuitry 220'. The distinction is the provision of the differential transmitter synchros 224 through 226. These synchros are necessary because the movement of the coarse tape 16, which drives the monitor sprocket 222' and then the monitor synchro 128', represents altitude including barometric and zero reading corrections. The electrical signal from the monitor synchro 128' is uncorrected altitude. The purpose of the differential transmitter synchros is to add these corrections to the monitor signal, so that, under normal operation, the monitor synchro 128' receives identical mechanical and electrical inputs.

Any wiring failure that may occur in either the stator or rotor windings of the differential transmitter synchros 224–226 will cause the monitoring system to respond in the same fashion as it does to a similar wiring failure in either the monitor synchro or the fine and coarse synchro stators.

(i) *Servo failures.*—Most of the preceding discussion shows how the malfunction monitoring system responds to failures in data synchros and monitor synchros. Many of these monitor areas lie outside the vertical scale indicator proper. However, the most extensive area monitored by the system is the vertical scale indicator follow-up servo itself. This area includes a two-speed switch, servo amplifier, servo motor and rate generator and all the electrical and mechanical connections between them, including the tapes.

If the servo is disabled by a short or open in the two-speed switch, amplifier or motor, failure will be indicated as soon as the tapes become improperly positioned by more than the monitor circuit threshold level.

If the gearing from the motor to the fine synchro jams for any reason, or if this gear train opens due to stripped gearing, loose gear clamps or any similar malfunction, of the servo motor is thereby prevented from bringing the fine synchro to a null, the monitor system will cause a failure to be indicated.

If similar malfunctions cause the gear train between the fine and coarse synchros to be open, causing these synchros to become improperly synchronized, the servo will oscillate. The oscillatory condition will cause a high monitor synchro output causing a failure indication.

As described in paragraph (a) above, if the mechanical orientation of the monitor synchro with respect to the fine synchro is lost due to tape slippage or breakage or due to a gear train malfunction, the monitor system will cause a failure to be indicated.

To summarize, if for any reason, the mechanical angle received by the monitor synchro from the follow-up servo loop differs from the electrical angle received by the monitor synchro from the central air data computer monitor input by more than the monitor circuit threshold level, the pilot is warned of this condition by the appearance of a flag over the tape of the affected channel.

FIGURE 9 shows the electronic circuitry for monitor circuit 130' of FIGURES 7 and 8 in greater detail, and is designated in FIGURE 9 as circuit 230. The circuit is provided with input terminals 231 for connection to the output terminals of the monitor synchro 128'. Signals are impressed upon a transistor Q2 for providing amplification. The output is taken from the collector electrode of transistor Q2 and transformer coupled through transformer means T2 to a full wave rectification circuit. These two components form the components G2 and transistor Q2 to form the amplification and rectification stage 232. The output of stage 232 is impressed upon a time delay network stage 233 adapted to provide a delay so as to limit velocity lag errors to well below minimum trip levels from the monitor synchro. The output of the time delay network stage 233 is impressed upon base electrode of a transistor Q3 provided to energize monitor flag solenoid 131' in the presence of a stick-off condition. When no voltage appears at the input terminals 231, a solenoid 131' after a predetermined delay period deenergizes solenoid 131' causing the flag to move into view in the display window under control of suitable spring bias means (not shown).

FIGURE 10 shows the self-test circuitry of FIGURES 7 and 8 in greater detail. The circuit of FIGURE 10 applies to airspeed and mach channels. In the altitude channel the differential transmitter synchros, shown in FIGURE 8, are interposed between the synchros in the manner shown in FIGURE 8. The description given for the operation of FIGURES 7 and 8 is identical for the operation of the circuit of FIGURE 10, with the exception that the means for the three-phase system are shown in greater detail in FIGURE 10. A further description of the circuit will therefore be omitted here for purposes of simplification.

A more detailed view of the take-up spools, as shown in FIGURE 3, are also shown in FIGURE 15. As was previously described, the effective diameters of the take-up spools vary with the amount of tape wound upon them. Hence, if the spool is geared directly to the drive sprocket, the peripheral speeds of the spool and sprocket will be different resulting in excessive slack or tearing of the tape. To compensate for these diameter variations, hair-spring means are provided to maintain the peripheral speed of the spool so as to be equivalent to that of the sprocket.

Referring to FIGURE 15, the drive sprocket 71a is shown as secured to a shaft 71d, the opposite end of which has secured thereto the sprocket drive gear 71a'. The drive sprocket is provided with the teeth 71e for meshing with the apertures or openings 15a in the tape 15. The tape is wound about the take-up spool 72a in the same manner as previously described. The take-up spool has its rotational movement controlled by the spool drive gear 72a', which is coupled to take-up spool 72a, in the following manner:

The spool drive 72a' is provided with a pin 240 having one end 241a of a hair-spring 241 mounted thereto. The opposite end 241b of hair-spring 241 is secured to a pin 242 which, in turn, has its opposite end secured to take-up spool 72a. The shaft 243 to which the spool drive gear 72a' is mounted passes through a central opening 72b in take-up spool 72a, but makes no fixed engagement therewith allowing spool 72a to rotate relative to shaft 243.

The spool drive gear 72a' being meshed with the sprocket drive gear 71a', rotates at an angular velocity completely controlled by the rotational velocity of sprocket drive gear 71a'. The rotation of spool drive gear 72a' is imparted to take-up spool 72a through the medium of the hair-spring 241 which acts to compensate for diameter variations between the drive sprocket 71a and the take-up spool 72a whose diameter varies due to the fact that the tape 15 is being wound or unwound from the spool. Thus, the hair-spring maintains the rotational velocity of the take-up spool 72a so as to be equivalent to the rotational velocity of the drive sprocket 71a. Similar arrangements are provided for all take-up spools in the system.

To insure proper tension in the drive tapes for the various command markers, the arrangement 250 of FIGURE 16 is employed. In this arrangement, two tape spools 77 and 77' are employed (note also FIGURE 3). The spool 77' is rigidly secured to a shaft 251 which is the same shaft which imparts rotation to this spool. A second spool 77 has secured thereto by fastening means 252 one end of a helical spring member 253 which is wound about shaft 251 and has its opposite ends secured by fastening means 254 to the shaft 251. The helical coil spring 253 loads the two pulleys 77 and 77' together providing suitable tension in the tape 78, thus preventing any backlash by the occurrence of tearing.

FIGURE 14 shows the intermittent motion mechanism 142 shown in FIGURES 5 and 6. As was previously described, the intermittent motion mechanism is the means by which the command markers become disengaged from their respective drives when they reach the display window upper and lower extremities. The intermittent motion mechanism 142 is comprised of input shaft 261 which drives a face cam 262 intermittently, but also which drives a gear sector 263 secured at a point intermediate the ends of shaft 261. The face cam is comprised of a substantially cylindrical portion having a groove 262a cut into the surface of the cylindrical portion 262. The face cam is employed to operate an output gear 264 mounted to rotate about a shaft 265. The opposite end of the face gear 264 constitutes the follower member for face cam 262. At the proper point in the rotational cycle of input shaft 261, the follower 266 will follow the groove 262a until it reaches the portion 262b thereof which moves the follower 266 and hence the upper gear 264 to the right, as shown by the arrow 267. This places the output gear into mesh with the gear sector 263. The output gear is then driven by the gear sector 263 for a part of the revolution of the input shaft and is taken out of mesh by the face cam for the remainder of the input. The period during which the output gear 264 meshes with the gear sector 263 constitutes the total travel between the upper and lower extremities of the display window. When the input shaft 261 rotates still further, the follower 266 moves back into the main portion of the groove 262a, thus sliding toward the left along shaft 265, as shown by arrow 267, so as to disengage the output gear 264 from the gear sector 263. Both slip clutches or spring loaded mechanisms are employed in this arrangement so as to greatly enhance the mechanical reliability.

FIGURE 11a shows the barometric adjustment and zero setting for the altitude tape mechanisms of FIGURE 5a in greater detail. Referring first to FIGURE 11c, there is shown therein a plot 300 having two curves 301 and 302 which represent the portions 1 and 2 of the altitude correction equation. The sum of these two curves gives the barometric correction which is the output of the barometric correction device.

Referring to FIGURE 11b there is shown therein a perspective view of the non-linear barometric pressure correction means which is employed in the servo system of FIGURE 5a. The setting knob 27, shown in FIGURE 5a, is mechanically coupled through coupling 27a, slip clutch 120, stop means 121, to the input shaft 122a of the non-linear compensation device. Shaft 122a has rigidly secured thereto first and second gear members 122b and 122c, respectively, so that any rotation imparted to shaft 122a is directly imparted to gears 122b and 122c. As can clearly be seen, the gears 122b and 122c are, in actuality, gear sectors with gear section 122b having its radial edges forming an angle of approximately 165.8°. Gear sector 122c has its radial edges forming an angle of 170.2°.

The gears 122b and 122c are provided with gear teeth which mesh with the gear members 122d and 122e, respectively. The gears 122d and 122e are completely circular gears and are rigidly secured to an output shaft 122f which is mechanically coupled to the differential 123, shown FIGURE 5a. Gears 122d and 122e are both provided with the same number of predetermined gear teeth, which number of gear teeth are set forth in FIGURE 11c. A sector 12g of both gears 122d and 122e is not provided with any teeth. The gear sector 122b is provided with 22.1 teeth, while the gear sector 122c is provided with 22.2 teeth.

The operation of the non-linear barometric adjustment means is as follows:

Let it be assumed that input shaft 122a is rotating in the clockwise direction as shown by arrow 122h. With the position of mechanism 122 as shown FIGURE 11b gear sector 122b is just about to become unmeshed with gear 122d. Simultaneously therewith gear sector 122c is just about to mesh with gear 122e. If the input shaft 122a rotates through an angle of 170.2° the output shaft 122f will undergo a greater amount of rotation, under control of gear sector 122c than it would were output shaft 122f under control of gear sector 122b when meshed with the output gear 122d.

The non-linear barometric correction device has a total range from 28″-Hg to 31″-Hg. The stop means prevents the mechanism from operating outside of this range. Thus a full input makes 14/15 of a turn, i.e., it rotates through an angle of 336°, yielding an extremely accurate non-linear output for barometric pressure adjustment.

The zero setting loop is comprised of the access cover 28 which, when appropriately rotated, uncovers an opening 29c in order to permit access to the screw head 29a for insertion of a screwdriver and the like. Rotation of the screw head 29a is coupled through the hermetic seal 29b to slip clutch 125, stop means 126 and one mechanical input of the differential mechanism 123a. Thus, the total correction output is introduced through the second differential 123a to the synchro devices 105, 106 and 124.

FIGURE 12 shows the slew switch command mach number mechanism for the device of FIGURE 6 and is comprised of the angle degree of freedom toggle or slew switch 48 which provides both the unit detent and rate slew features depending upon the length of arc traveled by the slew switch. The first plus or minus 7° of arc yields unit detent operation, while any arc travel beyond plus or minus 7° to the upper or lower extremities provides rate slew.

The slew switch 48 is coupled through suitable hermetic seal and coupling means and is mechanically linked to the unit detent device for rotational operation thereof. The unit detent or pulsing mechanism is comprised of mechanical coupling means 310 which links toggle 48 to the rotatable arm 312 of potentiometer 311, as well as the rotatable arm 314 of a communitator type device 313.

Potentiometer 311 is further comprised of resistor means 315, arranged to be wipingly engaged by rotatable arm 312 and having its opposite terminals electrically connected to plus (+) and minus (−) voltage sources. It should be noted that the center sector 315a of resistive means 315 is grounded.

Commutator means 313 is further comprised of three conductive segments 316–318, respectively, with segments 316 and 318 being connected in common through conductor means 319 to the input of break means 320. Break means 320 is normally deenergized and, in a normally deenergized state, locks counter 49, preventing the count within the counter to be changed either up or down.

The rotatable arm 314 is electrically connected to a voltage source +E. It should be noted that rotatable arm 312 is electrically insulated from voltage source +E in any suitable manner.

The operation of the unit detent mechanism is as follows:

When the toggle 48 is moved away from its center position shown in FIGURE 12 so as to rotate through an angle of 7° or less, this movement is coupled through coupling means 310 to rotatable arms 312 and 314, respectively. Rotatable arm 312 will rotate through a sufficiently small angle so that it will not go beyond section 315a, hence the output through rotatable arm 312 and conductor 321 will be zero.

Rotatable arm 314, however, will move through an angle sufficient for the arm to make wiping contact with either segment 316 or segment 318, depending upon whether an increase or decrease command is being performed. This will couple the +E voltage source through arm 314, segment 316 (or segment 318) and conductor 319 to break 320, thereby releasing break 320 and enabling counter 49 to have the count stored therein changed either up or down.

In order to provide some input to counter 49, toggle switch 48 need be "pulsed," i.e., tapped very slightly, to move rotatable arm 312 beyond sector 315a of resistor means 315. This will provide a small output through rotatable arm 312, conductor 321, and resistors R2, R1, and amplifier 322, to the motor-generator means 137–138, which is mechanically coupled to counter 49 thereby changing the count stored therein either up or down. Control "pulsing" in this manner will effectively yield unit increases to the count stored in counter 49.

In order to obtain continuous slewing the toggle 48 may be operated by hand so as to move through an arc of substantially greater than 7° in order to move rotating arm 312 toward one extreme end of resistor 314, depending upon whether an increase or decrease command is desired. This will cause a plus (+) or minus (−) voltage of a relatively high magnitude to be coupled through conductor 321 operating motor-generator 137–138 to increase (or decrease) the count in counter 49 at a substantially high rate. Stop means 323 prevents toggle 48 from moving through an arc of greater than 20°. Spring means 324 automatically returns toggle 48 to the center position, as shown in FIGURE 12, as soon as toggle 48 is released.

During high rate slewing, rotatable arm 314 will make sliding engagement with one or the other of segments 316 and 318 in order to release break means 320 during the high rate slewing operation.

FIGURE 13 shows the command altitude and command indicated airspeed mechanization which differs from the mechanization of FIGURE 12 in that it provides for the centerlock capability. As was previously described, the centerlock operation is performed by moving the slew switch 23 at right angles to the movement which it experiences in order to obtain detent or rate slewing. It should be noted that all like elements of FIGURES 12 and 13 have been designated with like numerals. All of these elements perform identical functions and, for an understanding of their operation the detailed description of FIGURE 12 should be considered.

In order to obtain centerlock operation the toggle 48 is moved into the slot 24a as shown in FIGURE 1. This movement is mechanically coupled from toggle 48 through the coupling means 325 to the movable arm 327 of centerlock switch 326. The centerlock switch is normally in the position shown in FIGURE 13 when a centerlock operation is not called for. This places movable arm 327 into electrical engagement with stationary contact 328, thereby coupling the output of rotatable arm 312 through conductor 321 so as to energize the motor-generator means 137–138.

In order to perform a centerlock operation, toggle 48 is moved into slot 24a, mentioned previously, thereby causing movable arm 327 (through mechanical coupling means 325) to make electrical engagement with stationary contact 329. This operation couples the output of centerlock control transformer 330 through conductor 331, to motor-generator 137–138.

The mechanical input of centerlock control transformer 330, shown in 330a is coupled to the output of intermittent motion mechanism 142, which also has its output coupled to command marker 86 as shown in FIGURE 5a–a.

The operation of the centerlock mechanism is as follows:

When a centerlock operation is desired, toggle 48 is moved into the slot 24a causing the movable arm 327 of centerlock switch 326 to make electrical engagement with stationary contact 329. It should also be noted that the rate slewing mechanism 311 is disconnected at this time.

The centerlock control transformer 330 generates an electrical output depending upon the state of the command marker and this output is coupled through conductor 331 and centerlock switch 326 through the motor-generator set 137–138. This automatically sets the count in counter 49 to the value stored in intermittent motion mechanism 142. As was previously described the break means 320 must be released in order to permit the count in counter 49 to change. This is provided for by allowing the mechanical coupling means 310 to move the rotatable arm 314 into wiping engagement with either of the two segments 316 or 318 in order to energize and hence release break means 320. While the commutator means 313 has been shown to have a centrally located conductive segment 317 it should be noted that this conductive segment (for both FIGURES 12 and 13) is not electrically connected to any output device and hence may be completely omitted if so desired.

Upon completion of a centerlock operation, the operator need only release toggle 48. Spring means 324 will then automatically return toggle 48 to the centerline position and thereby return movable arm 327 of centerlock switch 326 into electrical engagement with stationary contact 328.

It can be seen from the foregoing that the instant invention provides a novel vertical scale indicating device having movable tapes, which are so grouped, as to facilitate the simple and straightforward observation thereof. These tapes are mounted behind wedge lighting means which provide excellent illumination for reading the tapes, while at the same time minimizing light leakage into the cockpit or operator's area. The device is further provided with movable command marker means which can operate with the movable tapes to provide easily readable command indications. The tapes and command markers are controlled by novel servo means which provide precision positioning of tapes and markers; continuous monitoring of the device to indicate any failure thereof and which further provide novel unit detent and slewing operation for the command markers, as well as providing means for bringing the command marker and its associate command counter into alignment with one another so as to provide one and the same reading for both the command counter and its associated tape. Novel intermittent motion mechanisms are provided for keeping command markers in view at all times, while at the same time preserving the value which the command marker would ordinarily indicate, but for the off-scale position. Further means are provided for establishing the accuracy of the servo system and movable tapes by causing them to operate under control of predetermined voltage levels in order to establish whether the tapes are properly responding by yielding the readings which the predetermined voltages represent.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. For use in aircraft condition indicating means for providing visually observable readings of specific flight information comprising:

vertical scale indicating means having tape means selectively movable in both upward and downward vertical directions;

said tape means comprising a movable tape having graduations representative of the variable condition being measured;

a stationary reference means positioned in front of said movable tape and cooperating with the graduations on said tape to testablish the reading at any given instant;

movable command marker means having a movable command marker positioned in front of said movable tape and cooperating with the graduations on said tape to provide a command reading at any given instant;

slew switch means having first and second positions for moving said command marker;

said slew switch means having means for moving said command marker by an incremental amount when said slew means is moved to said first position; and means for continuously moving said command marker when said slew switch means is moved to said second position.

2. For use in aircraft condition indicating means for providing visually observable readings of specific flight information comprising:

vertical scale indicating means having tape means movable in both upward and downward vertical directions;

said tape means comprising a movable tape having graduations representative of the variable condition being measured;

a window exposing a portion of said movable tape;

a stationary reference means positioned across said window in front of said movable tape and cooperating with the graduations on said tape to establish the reading at any given instant;

movable command marker means having a movable command marker positioned in front of said movable tape and cooperating with the graduations on said tape to provide a command reading at any given instant;

said movable command marker means comprising intermittent motion mechanism means to limit the travel of said command marker within predetermined upper and lower limits;

said intermittent motion mechanism comprising means for storing the remaining value of the reading which is beyond the upper or lower limits of travel of said command marker, said intermittent motion mechanism comprising:

a shaft having an input gear driven by a command marker input;

a gear sector secured to said shaft;

an output gear selectively driven by said gear sector;

a cam secured to said input gear;

a cam follower secured to said output gear for following said cam surface to selectively position said output gear into meshing alignment with said gear sector only when the portion of said movable tape exposed in said window displays the command reading.

3. For use in aircraft condition indicating means for providing visually observable readings of specific flight information comprising vertical scale indicating means having tape means movable in both upward and downward vertical directions; said tape means comprising a movable tape having graduations representative of the variable condition being measured; a stationary reference means positioned in front of said movable tape and cooperating with the graduations on said tape to establish the reading at any given instant; movable command marker means having a movable command marker positioned in front of said movable tape and cooperating with the graduations on said tape to provide a command reading at any given instant; the length of said movable tape being many times longer than the portion of said tape which is displayed at any given instant; first and second take-up spool means for receiving first and second ends of said tape; first and second rotatable drive sprocket means for driving said tape; first means mechanically coupling the rotation of said first drive sprocket means to said first take-up spool means; second means for mechanically coupling the rotation of said second drive sprocket means to said second take-up spool means; said first and second coupling means including spring means for maintaining its associated take-up spool means to rotate at the same velocity as its associated drive sprocket means.

4. For use in aircraft condition indicating means for providing visually observable readings of specific flight information comprising vertical scale indicating means having tape means movable in both upward and downward vertical directions; said tape means comprising a movable tape having graduations representative of the variable condition being measured; a stationary reference means positioned in front of said movable tape and cooperating with the graduations on said tape to establish the reading at any given instant; movable command marker means having a movable command marker positioned in front of said movable tape and cooperating with the graduations on said tape to provide a command reading at any given instant; said movable command marker means comprising a marker tape member; first means for effectively joining the ends of said marker tape member comprising a shaft; a first spool rigidly secured to said shaft at its center; a second spool positioned to rotate freely about said shaft; helical spring means wound about said shaft having a first end secured to said shaft and a second end secured to said second spool; said first and second spools receiving opposite ends respectively, of said marker tape; said first means acting to prevent buckling or breaking of said tape.

5. Vertical scale indicating means for providing a visually observable altitude reading; adjustable means for providing non-linear variation of barometric pressure as a function of height comprising a manually adjustable input shaft; first and second gear sectors rigidly secured to said input shaft; an output shaft aligned substantially parallel to said input shaft; third and fourth gears rigidly secured to said output shaft and being positioned to mesh with said first and second gear sectors, respectively; said first gear sector being meshed with said third gear as said second gear sector becomes disengaged from said fourth gear; said second gear sector being meshed with said fourth gear as said first gear becomes disengaged from said third gear.

6. The device of claim 5 wherein the teeth on said first gear sector and said third gear are more closely spaced than the teeth on said second gear sector and said fourth gear.

7. The means of claim 2 wherein said cam surface is a generally cylindrical shaped member having a groove around its periphery;

a small portion of said groove being linearly offset relative to the remainder of said groove.

8. The means of claim 7 wherein said cam follower is a disc shaped member having its periphery riding in said groove.

9. The means of claim 1 wherein said slew switch means is movable to a third position;

means for moving said command marker into alignment with the stationary reference means when said slew switch means is moved to said third position.

10. The system of claim 1 further comprising means for driving said movable tape responsive to an input control signal;

means coupled to said movable tape for generating a test signal representing the tape position;

flag means movable into view in said window;

means receiving said control signal and said test signal for moving said flag into view in said window when said aforementioned signals do not substantially balance one another.

11. The means of claim 1 further comprising test means for providing a signal capable of driving said movable tape to a predetermined reading;

manually operable means for disconnecting the control signal from said means for moving said tape and for connecting said test means thereto to test the accuracy of said movable tape.

12. The means of claim 10 wherein said flag moving means is further comprised of delay means for delaying comparison of said aforementioned signals for a predetermined period of time to allow for differences in said aforementioned signals while said tape is being moved.

References Cited

UNITED STATES PATENTS

| | | | |
|---|---|---|---|
| 2,646,637 | 7/1953 | Nierenberg et al. | 240—1 |
| 2,761,056 | 8/1956 | Lazo | 240—2.1 |
| 2,907,869 | 10/1959 | Hudson et al. | 240—2.1 |
| 2,941,400 | 6/1960 | Nesbit | 73—178 |
| 3,040,168 | 6/1962 | Stearns | 240—2.1 |
| 3,117,312 | 1/1964 | Watson | 340—27 |
| 3,182,631 | 5/1965 | Gomes | 73—178 |

LOUIS J. CAPOZI, *Primary Examiner.*